(12) United States Patent
Maetani

(10) Patent No.: US 8,811,782 B2
(45) Date of Patent: Aug. 19, 2014

(54) OPTICAL TRANSMISSION BOARD, OPTICAL TRANSMISSION MODULE, AND METHOD FOR MANUFACTURING OPTICAL TRANSMISSION BOARD

(75) Inventor: Maraki Maetani, Soraku-gun (JP)

(73) Assignee: Kyocera Corporation, Kyoto-Shi, Kyoto (JP)

(*) Notice: Subject to any disclaimer, the term of this patent is extended or adjusted under 35 U.S.C. 154(b) by 0 days.

(21) Appl. No.: 13/819,485

(22) PCT Filed: Aug. 31, 2011

(86) PCT No.: PCT/JP2011/069834
§ 371 (c)(1),
(2), (4) Date: Feb. 27, 2013

(87) PCT Pub. No.: WO2012/029880
PCT Pub. Date: Mar. 8, 2012

(65) Prior Publication Data
US 2013/0163920 A1  Jun. 27, 2013

(30) Foreign Application Priority Data

Aug. 31, 2010 (JP) ................ 2010-193323
Aug. 31, 2010 (JP) ................ 2010-193324
Jun. 29, 2011 (JP) ................ 2011-143693
Jun. 29, 2011 (JP) ................ 2011-143694

(51) Int. Cl.
*G02B 6/43* (2006.01)

(52) U.S. Cl.
CPC .................. *G02B 6/43* (2013.01)
USPC ............................................. 385/49

(58) Field of Classification Search
CPC ........................................... G02B 6/43
USPC ............................................. 385/49
See application file for complete search history.

(56) References Cited

U.S. PATENT DOCUMENTS

| | | | |
|---|---|---|---|
| 5,125,054 A * | 6/1992 | Ackley et al. | 385/49 |
| 6,153,359 A * | 11/2000 | Shimizu et al. | 252/79.1 |
| 6,236,786 B1 * | 5/2001 | Aoki et al. | 385/50 |
| 6,804,423 B2 * | 10/2004 | Tsukamoto et al. | 385/14 |
| 7,239,767 B2 * | 7/2007 | Kim et al. | 385/14 |
| 8,249,402 B2 * | 8/2012 | Asai et al. | 385/14 |
| 2002/0051599 A1 * | 5/2002 | Tsukamoto et al. | 385/14 |

FOREIGN PATENT DOCUMENTS

| | | |
|---|---|---|
| JP | 2004294857 A | 10/2004 |
| JP | 2010085438 A | 4/2010 |
| JP | 2010134299 A | 6/2010 |

* cited by examiner

*Primary Examiner* — Charlie Peng
(74) *Attorney, Agent, or Firm* — Volpe and Koenig, P.C.

(57) ABSTRACT

An optical transmission board includes a substrate being provided with a through hole formed in a thickness direction of the substrate so as to penetrate from top to bottom of the substrate; a cladding member at least part of which locates inside the through hole, having an optical waveguide hole being inside the through hole and penetrating the cladding member in the thickness direction thereof, and having an upper surface having a surface roughness smaller than that of an upper surface of the substrate; a core member disposed inside the optical waveguide hole; an electrically conductive body disposed on the upper surface of the cladding member; and an optical element electrically connected to the electrically conductive body, having a light-receiving surface or a light-emitting surface opposed to an upper surface of the core member.

16 Claims, 17 Drawing Sheets

FIG. 5
(a)
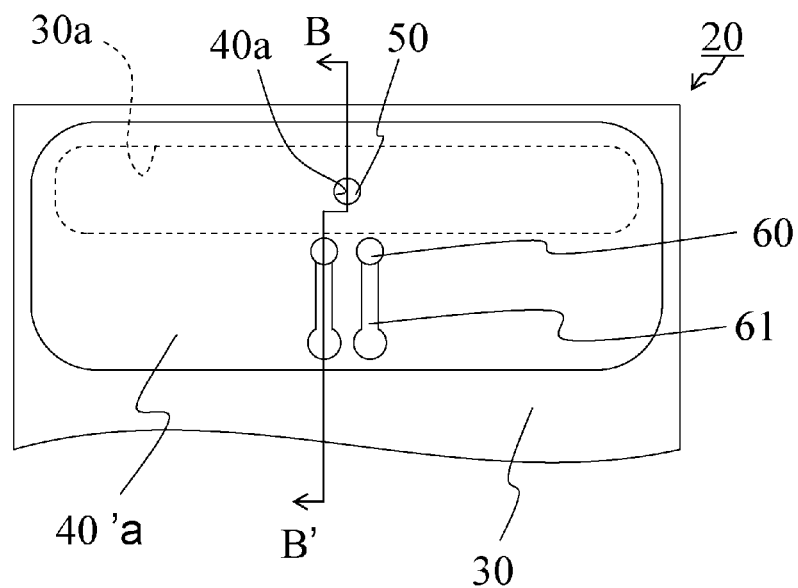
(b)
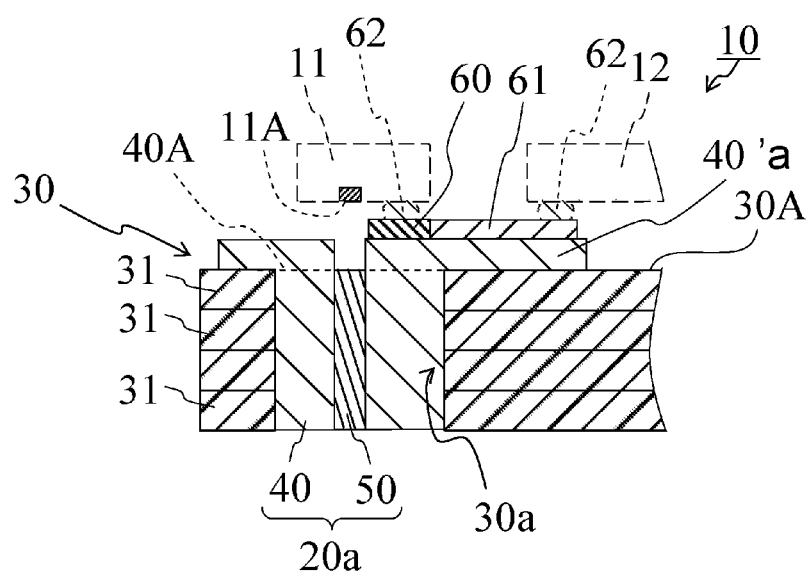

FIG. 13
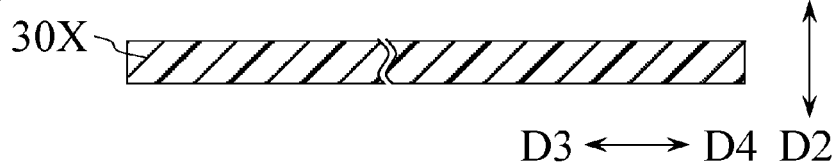
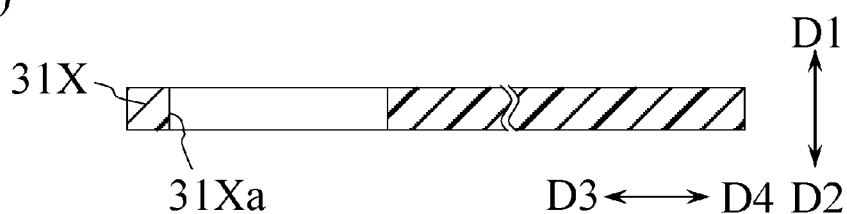
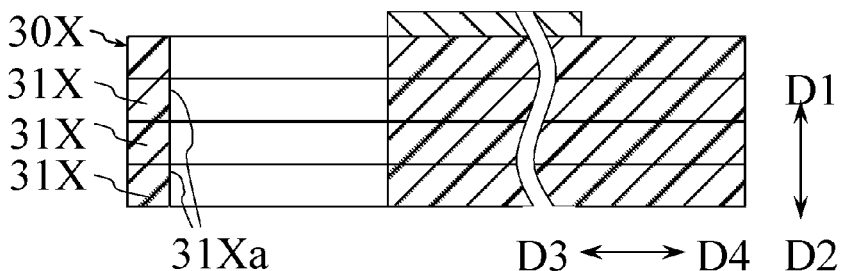
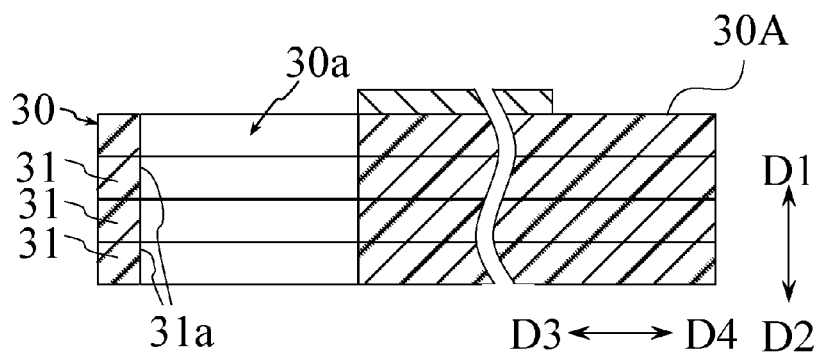

FIG. 14
(a)
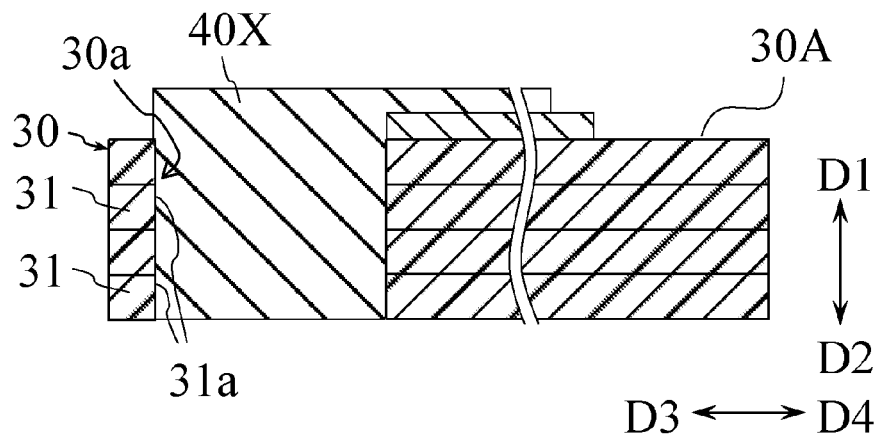
(b)
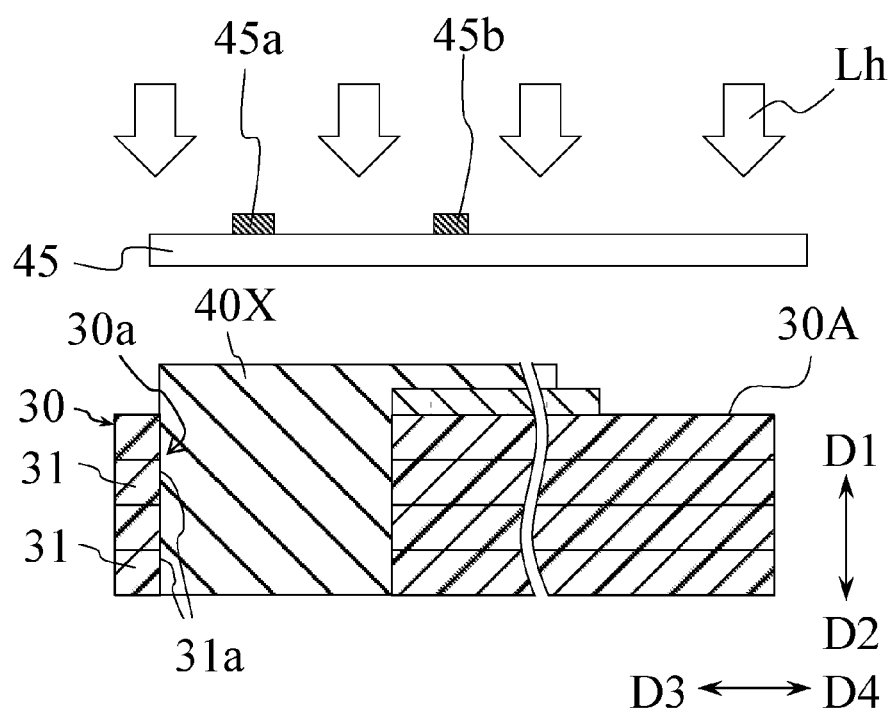

FIG. 15
(a)
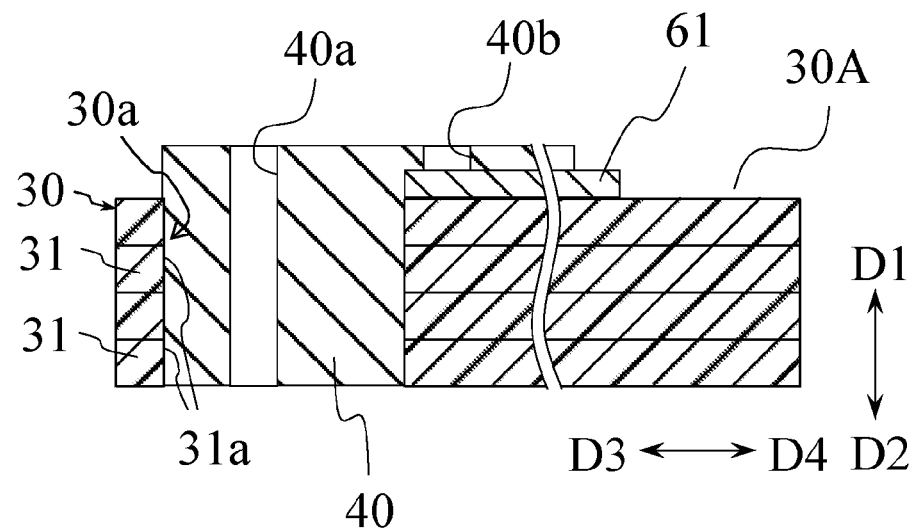
(b)
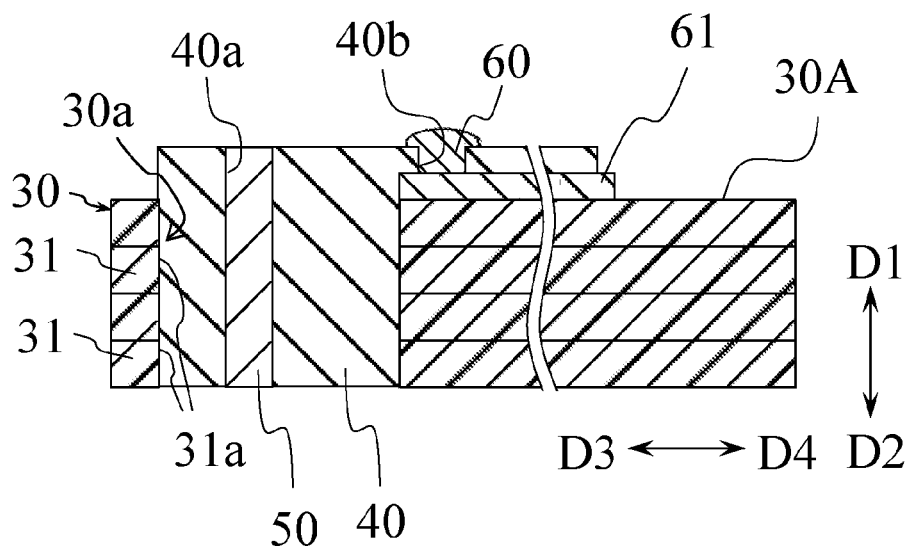

FIG. 16
(a)
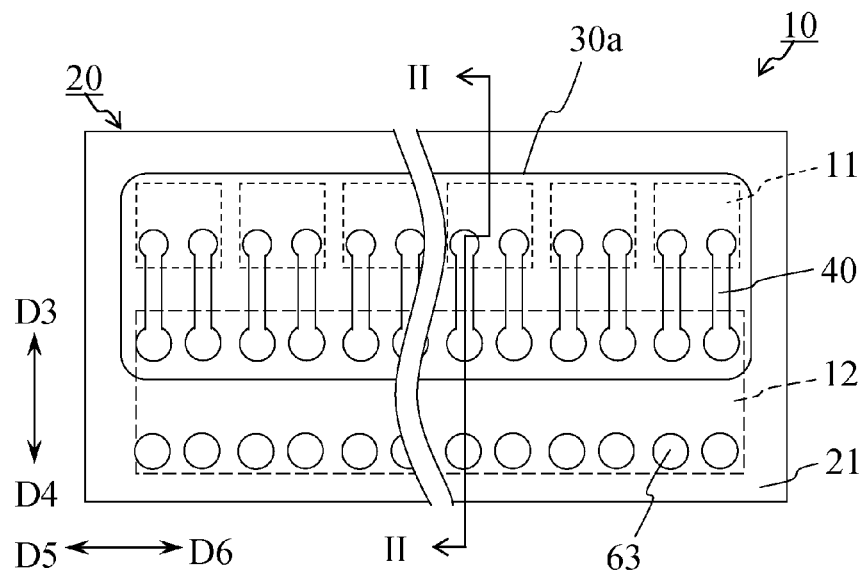
(b)
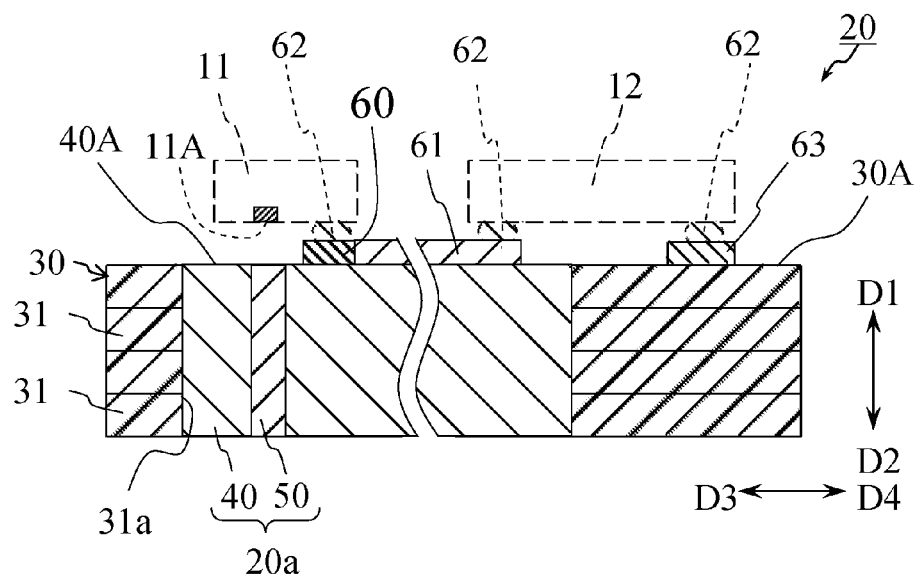

OPTICAL TRANSMISSION BOARD, OPTICAL TRANSMISSION MODULE, AND METHOD FOR MANUFACTURING OPTICAL TRANSMISSION BOARD

TECHNICAL FIELD

The present invention relates to an optical transmission board and an optical transmission module, and a method for manufacturing the optical transmission board.

BACKGROUND ART

Recently, in the interest of enhancement in information processing capacity, researches and studies have been conducted as to replacement with an optical transmission system in regard to telecommunication between electrical devices such as integrated circuit components. For example, in Japanese Unexamined Patent Publication JP-A 2004-294857, there is disclosed an optical transmission board constructed to form an electrically conductive body on an optical waveguide substrate having an optical waveguide, and then mounting an optical element on the electrically conductive body.

Currently, in the field of optical transmission board technology, it is essential to design the optical transmission board in conformity to a wiring substrate or the like on which the transmission board is mounted. Therefore, greater flexibility is demanded in the design of an optical transmission board.

SUMMARY OF THE INVENTION

An object of the invention is to provide an optical transmission board and an optical transmission module that can be constructed with high design flexibility and a method for manufacturing the optical transmission board.

An optical transmission board in accordance with a first embodiment of the invention includes: a substrate being provided with a through hole formed in a thickness direction of the substrate so as to penetrate from top to bottom; a cladding member at least part of which locates inside the through hole, having an optical waveguide hole being inside the through hole and penetrating the cladding member in the thickness direction thereof, and having an upper surface having a surface roughness smaller than that of an upper surface of the substrate; a core member disposed inside the optical waveguide hole; an electrically conductive body disposed on the upper surface of the cladding member; and an optical element electrically connected to the electrically conductive body, having a light-receiving surface or a light-emitting surface opposed to an upper surface of the core member.

An optical transmission board in accordance with a second embodiment of the invention includes: a substrate being provided with a through hole formed in a thickness direction of the substrate so as to penetrate from top to bottom; a cladding member at least part of which locates inside the through hole, and having an optical waveguide hole being inside the through hole and penetrating the cladding member in the thickness direction thereof; a first core member disposed inside the optical waveguide hole; an intermediate layer disposed on an upper surface of the cladding member, having an upper surface having a surface roughness smaller than that of an upper surface of the substrate; an electrically conductive body disposed on the upper surface of the intermediate layer; and an optical element electrically connected to the electrically conductive body, having a light-receiving surface or a light-emitting surface opposed to an upper surface of the first core member.

An optical transmission module in accordance with an embodiment of the invention includes: the above-described optical transmission board; and a circuit component electrically connected to the electrically conductive body.

A method for manufacturing an optical transmission board in accordance with an embodiment of the invention includes: preparing a substrate which is provided with a through hole formed in a thickness direction of the substrate so as to penetrate from top to bottom of the substrate, and also has an electric wiring disposed on an upper surface of the substrate; filling a photosensitive material into the through hole and applying the photosensitive material on to the electric wiring; placing a light-shielding plate having a first light-shielding section and a second light-shielding section so that the second light-shielding section which locates in overlapping relation with the electric wiring; turning the photosensitive material into a cladding member having unexposed portions corresponding to regions in overlapping relation with the first light-shielding section and the second light-shielding section, respectively, by effecting light exposure on a to-be-exposed portion corresponding to a region of the photosensitive material other than the regions thereof in overlapping relation with the first light-shielding section and the second light-shielding section; forming an optical waveguide hole corresponding to the first light-shielding section and a cladding through hole corresponding to the second light-shielding section by removing the unexposed portions of the photosensitive material so as to pierce the photosensitive material from top to bottom in a thickness direction thereof; filling a core member which is inside the optical waveguide hole and made of a light-transmitting material having a refractive index larger than the cladding member; and forming a through conductor by filling an electrically conducting material into the cladding through hole.

According to the invention, it is possible to provide an optical transmission board and an optical transmission module that can be constructed with high design flexibility and a method for manufacturing the optical transmission board.

BRIEF DESCRIPTION OF DRAWINGS

FIG. 5 is a sectional view of a modified example of the optical transmission board shown in FIG. 2, wherein FIG. 5(a) is a plan view of the construction shown in FIG. 3 and FIG. 5(b) illustrates a section of the construction taken along the line B-B' shown in FIG. 5(a);

FIG. 13 is a sectional view of a procedure for manufacturing the optical transmission board in accordance with the first embodiment of the invention, illustrating the section of the construction taken along the line A-A' shown in FIG. 3;

FIG. 14 is a sectional view showing the subsequent steps of the procedure for manufacturing the optical transmission board shown in FIG. 13;

FIG. 15 is a sectional view showing the subsequent steps of the procedure for manufacturing the optical transmission board shown in FIG. 14;

FIG. 16 is a view showing a modified example of the optical transmission module shown in FIG. 2, wherein FIG. 16(a) is a plan view and FIG. 16(b) illustrates a section of the construction taken along the line D-D' shown in FIG. 16(a);

DESCRIPTION OF EMBODIMENTS

<First Embodiment of Optical Transmission Board>

Hereinafter, as the optical transmission board in accordance with a first embodiment of the invention and the optical transmission module in accordance with an embodiment of the invention, an optical transmission module 10 and an optical transmission board 20 will be illustrated with reference to the drawings.

Figure 1:
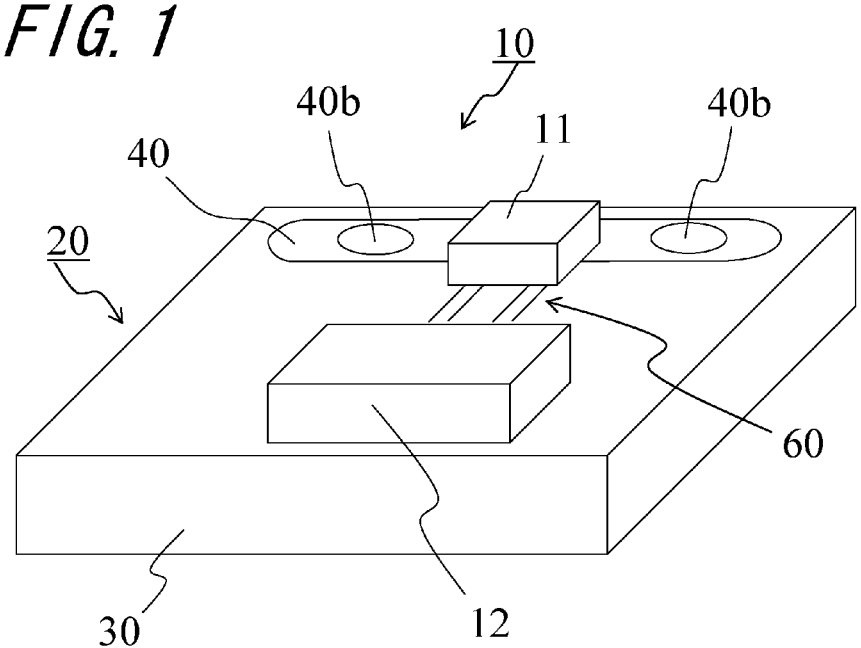
FIG. 1 is a partial perspective view showing the schematic constitution of an optical transmission module in accordance with an embodiment of the invention.
Figure 2:
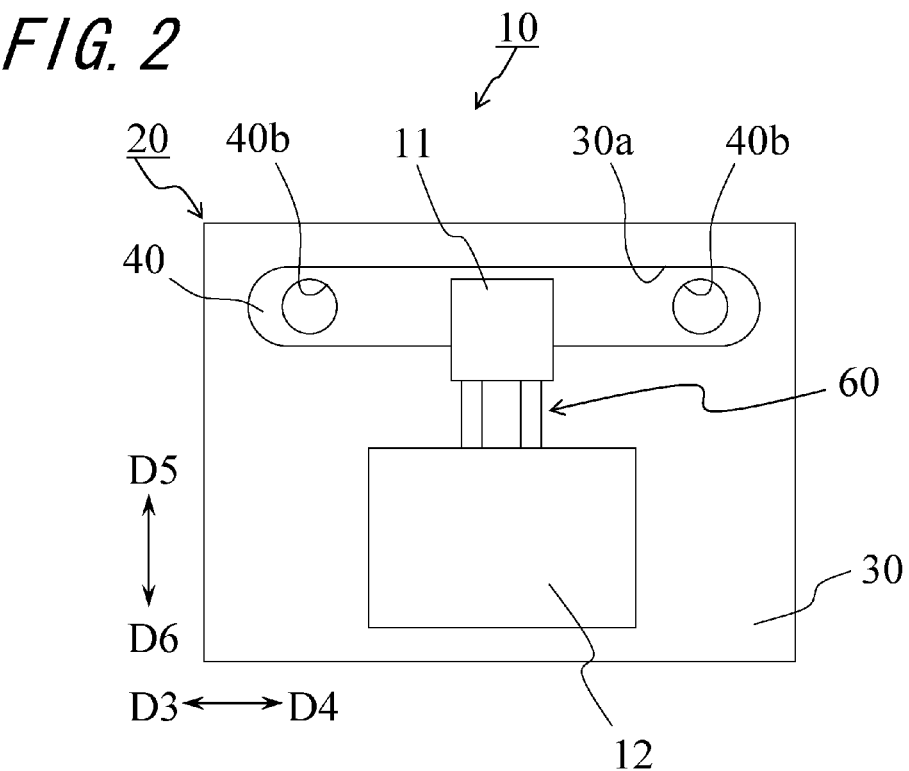
FIG. 2 is a plan view showing the schematic constitution of the optical transmission module shown in FIG. 1.

The optical transmission module 10 as shown in FIGS. 1 and 2 includes an optical transmission board 20 and a circuit component 12. The optical transmission board 20, which is illustrated in a plan view in FIGS. 3 and 4 with an optical element 11 and the circuit component 12 removed, includes a substrate 30, a cladding member 40, a core member 50, and an electrically conductive body 60.

The substrate 30 acts to support the cladding member 40 and the core members 50. For example, the thickness of the substrate 30 may advisably fall in the range of 0.1 mm or more and 2 mm or less. As the substrate 30, for example, use can be made of an epoxy resin substrate formed of a glass base material, a copper-clad substrate formed of a glass base material, a polyimide resin substrate, and a ceramic substrate. The substrate 30 is constructed of a single-layer substrate or a stacked body made of a stack of a plurality of substrates. In this embodiment, a plurality of ceramic substrates are employed. The substrate 30 of this embodiment is constructed by stacking a plurality of secondary substrates 31 together.

Figure 4:
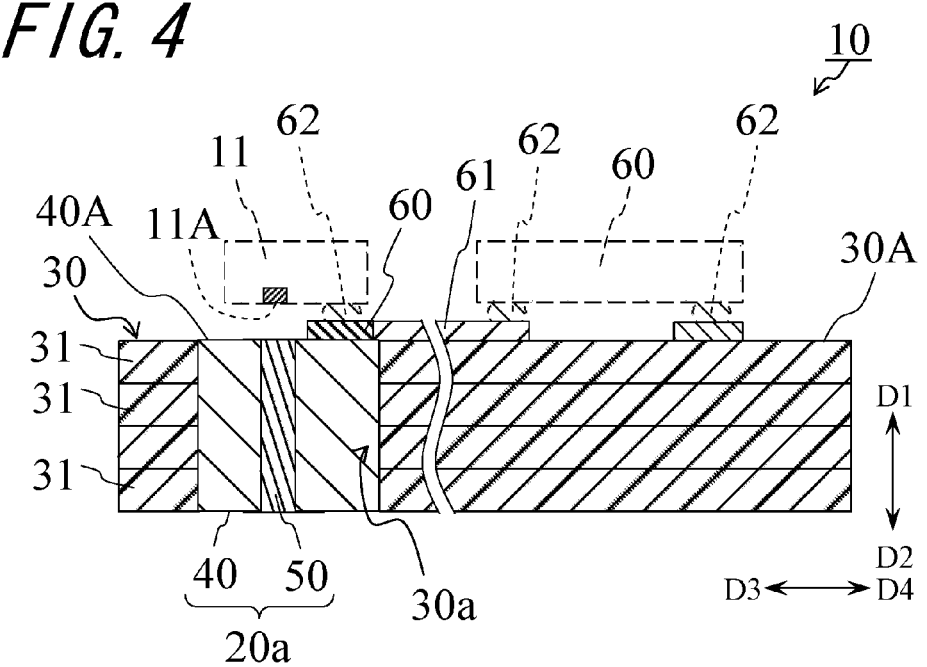
FIG. 4 is a sectional view of the optical transmission board shown in FIG. 2 taken along the line A-A'.

As shown in FIG. 4, the substrate 30 is provided with a through hole 30a formed in a thickness direction of the substrate 30 so as to penetrate from top to bottom of the substrate 30. The through hole 30a is composed of a series of secondary through holes 31a formed in the secondary substrates 31. The secondary through holes 31a are formed in their respective secondary substrates 31 so as to penetrate through the secondary substrates 31 in a thickness direction of the secondary substrates 31. In FIG. 4, said thickness direction is defined as "the D1-D2 direction".

Inside the through hole 30a, at least part of the cladding member 40 is located. That is, the cladding member 40 may either be located so as to fill the entire inside of the through hole 30 or be located so as not to fill the entire inside of the through hole 30. Moreover, the cladding member 40 does not necessarily have to be formed so as to locate only inside the through hole 30, and, for example, it may be formed so as to locate inside the through hole 30a while extending from the inside to part of the surface of the substrate 30. This embodiment will be described with respect to the case where the cladding member 40 locates inside the through hole 30a.

Figure 3:
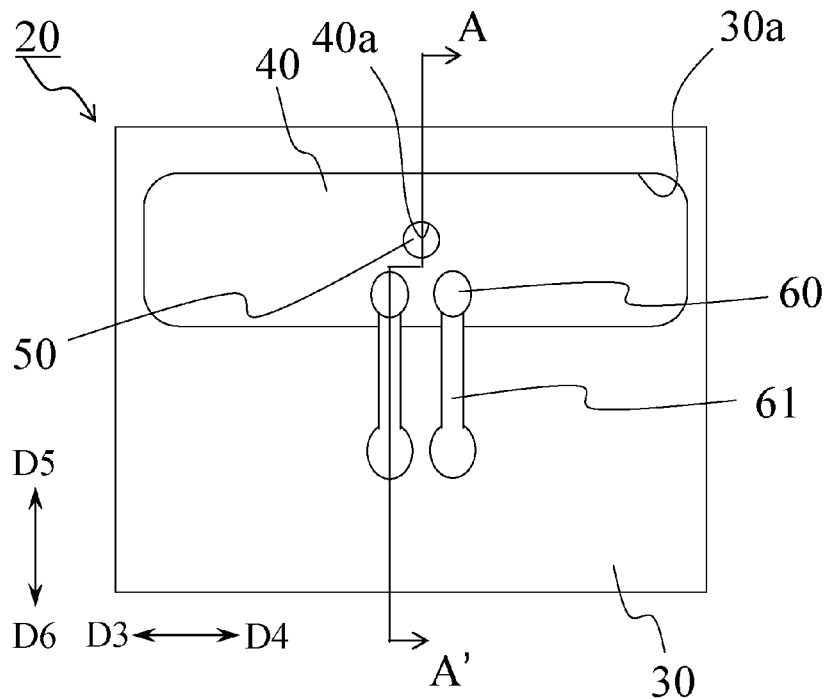
FIG. 3 is a plan view showing the schematic constitution of a first embodiment of an optical transmission board constituting the optical transmission module shown in FIG. 1.

The cladding member 40 acts to support the core member 50 disposed in the interior thereof. The cladding member 40 has a plurality of through holes penetrating therethrough in a thickness direction thereof. The through hole is defined as an optical waveguide hole 40a. The optical waveguide holes 40a are arranged along one direction which is perpendicular to the thickness direction. Said one direction is defined as a first direction in this embodiment. In FIGS. 2 to 4, the first direction is represented as "the D3-D4 direction". Moreover, the first direction corresponds to a planar direction of the substrate 30. Inside the optical waveguide hole 40a, the core member 50 is disposed. For example, the spacing between the core members 50 in the first direction may advisably fall in the range of 62.5 μm or more and 250 μm or less.

The surface roughness of an upper surface 40A of the cladding member 40 is smaller than the surface roughness of an upper surface 30A of the substrate 30. The surface roughness can be determined on the basis of, for example, ten-point average height (roughness) Rz. For example, the ten-point average height Rz according to JIS B 0601-2001 can be employed. In each of the upper surface 40A of the cladding member 40 and the upper surface 30A of the substrate 30, where the surface roughness varies greatly from part to part as the result of measurement, the maximum height Ry can be employed for the surface roughness. For example, the maximum height Ry according to JIS B 0601-2001 can be employed.

It is sufficient that the surface roughness (ten-point average height Rz) of the cladding member 40 is adjusted to be smaller than the surface roughness (ten-point average height Rz) of the substrate 30. The surface roughness (ten-point average height Rz) of the cladding member 40 can therefore be set to be less than or equal to 0.5 μm. The reason why the cladding member 40 has a surface roughness smaller than that of the substrate 30 is because the cladding member 40 is made of a resin material such as epoxy resin. As will hereafter be described, this is presumably because, due to baking of the resin material, the resin material is cured with its surface roughness kept small.

The core member 50 functions as an optical waveguide 20a of the optical transmission board 20. The core member 50 has a refractive index larger than the cladding member 40. Thus, so long as the refractive index of the core member 50 is greater than the refractive index of the cladding member 40, the core member 50 is able to serve as the optical waveguide 20a. That is, the cladding member 40 functions as a so-called cladding of the optical waveguide 20a, whereas the core member 50 functions as a core of the optical waveguide 20a. For example, the refractive index of the core member 50 may be so determined that the relative refractive index difference between the core member 50 and the cladding member 40 falls in the range of 0.8% or more and 4% or less.

In the optical waveguide 20a, the upper surface 40A of the cladding member 40 may be made in plane with the end face of the core member 50. By arranging the upper surface 40A of the cladding member 40 in this way, it is possible to mount the optoelectronic conversion device 11 with high accuracy.

The electrically conductive body 60 is disposed on the upper surface 40A of the cladding member 40. The electrically conductive body 60 makes electrical connection with the optoelectronic conversion device 11. It is sufficient that at least part of the electrically conductive body 60 is located on the upper surface 40A of the cladding member 40. Specifically, the electrically conductive body 60 may either be disposed entirely on the upper surface 40A of the cladding member 40 or be disposed so as to extend continuously from the upper surface 40A of the cladding member 40 to the upper surface 30A of the substrate 30. It is advisable to use an electrically conducting material for the electrically conductive body 60 and, for example, a metal material or a material made of a stack of transparent electrically conducting materials, an electrically conducting paste such as solder, an electrically conducting adhesive, or the like can be used.

The electrically conductive body 60 is led out to the top of the substrate 30 by way of an electric wiring 61. The electric wiring 61 may either be made of the same material as that used for the electrically conductive body 60 or be made of a material different from the material used for the electrically conductive body 60. The electric wiring 60 may include a through conductor which is so formed as to penetrate through the secondary substrate 31, as well as an intermediate wiring layer which is formed between two secondary substrates 31. The through conductor may either be shaped so that it is hollowed in the middle or be shaped so that it is filled with an electrically conducting paste or the like in the middle. The through conductor can be formed by means of plating, metal-film vapor deposition, electrically conductive resin injection, or otherwise. In this embodiment, the electrically conductive body 60, in its entirety, is disposed on the upper surface 40A of the cladding member 40, and the electric wiring 61 is so formed as to extend continuously from the upper surface 40A of the cladding member 40 to the upper surface 30A of the substrate 30.

The optoelectronic conversion device 11 is mounted so that it makes electrical connection with the electrically conductive body 60. Moreover, the optoelectronic conversion device 11 is placed so that its light-receiving surface or light-emitting surface (hereafter referred to as "light-receiving or light-emitting surface 11A") is opposed to an upper surface 50A of the core member 50. For example, it is advisable that the light-receiving or light-emitting surface 11A of the optoelectronic conversion device 11 is disposed in overlapping relation with the upper surface 50A of the core member 50 as seen in a plan view.

The optoelectronic conversion device 11 has a function of emitting light on the basis of inputted electric signals, or a function of effecting conversion into electric signals on the basis of incident light. The optoelectronic conversion device 11 is optically coupled to the optical waveguide 20a. The optoelectronic conversion device 11 of this embodiment performs a function of transmitting optical signals to the optical waveguide 20a on the basis of electric signals inputted thereto through the electrically conductive body 60 and the electric wiring 61, or a function of transmitting electric signals to the electric wiring 60 on the basis of optical signals inputted thereto through the optical waveguide 20a.

As the optoelectronic conversion device 11, a variety of light-emitting devices are applicable. For example, a vertical cavity surface emitting laser (VCSEL) can be used for the optoelectronic conversion device 11. Also, as the optoelectronic conversion device 11, a variety of light-receiving devices, including a photo diode (PD), are applicable. In the case of employing PD as such a light-receiving device, it is desirable to use a fast-responsive device, for example, PIN-PD.

The optoelectronic conversion device 11 may either be constructed of one element having a single light-receiving or light-emitting surface 11A or be constructed of one element having a plurality of light-receiving or light-emitting surfaces 11A. The optoelectronic conversion device 11 of this embodiment is constructed of one element having a single light-receiving or light-emitting surface 11A. A single light-receiving or light-emitting surface 11A is so disposed as to be brought into correspondence with a single core member 50 (optical waveguide 20a).

In the optical transmission board 20 of this embodiment, the electrically conductive body 60 is disposed on the upper surface 40A of the cladding member 40. Therefore, the position of the optoelectronic conversion device 11 relative to the core member 50 can be controlled by adjusting, for example, the position of the cladding member 50 and the position of the electrically conductive body 60 relative to the core member 50, and this allows greater flexibility in the design of the optical transmission board.

Moreover, the optical transmission board may have a structure in which the electrically conductive body 60 is disposed on the upper surface 40A of the cladding member 40 having a surface roughness smaller than that of the upper surface 30A of the substrate 30. In the optical transmission board 20 having such a structure, in contrast to the case where the electrically conductive body 60 is disposed on the upper surface 30A of the substrate 30, the value of electrical resistance of the electrically conductive body 60 can be reduced. Further, since the electrically conductive body 60 is disposed on the upper surface 40A of the cladding member 40 having a smaller surface roughness, it is possible to improve the high-frequency characteristics of an electric signal which passes through the electrically conductive body 60. Thereby, where the optoelectronic conversion device 11 is a light-emitting device for example, it is possible to suppress fluctuations in the optical intensity of light emitted from the light-emitting device. On the other hand, where the optoelectronic conversion device 11 is a light-receiving device for example, it is possible to suppress fluctuations in the electric signal of light received by the light-receiving device.

The reason why the upper surface 40A of the cladding member 40 has a surface roughness smaller than that of the upper surface 30A of the substrate 30 is because the cladding member 40 is made of a resin material such for example as epoxy resin. This is presumably because, due to baking of the resin material, the resin material is cured with its surface roughness kept small.

By contrast, in an optical transmission board constructed to form an electrically conductive body on a substrate, the electrically conductive body for mounting an optical element is disposed on the substrate. In this construction, the upper surface of the substrate has a high degree of surface roughness, wherefore the current density of electric current flowing through the electrically conductive body is prone to fluctuations at the interface with the substrate, which makes it difficult to achieve improvement in electrical characteristics and high-frequency characteristics. Furthermore, since the degree of surface roughness of the upper surface of the substrate is high, it is difficult to make an electric wiring finer, which gives rise to the possibility that electrical resistance is increased with the reduction in size.

(Modified Example 1 of Optical Transmission Board)

As shown in FIG. 5, the cladding member 40 may further include a first extending portion 40'*a* extending continuously from the inside of the through hole 30*a* to the upper surface 30A of the substrate 30 so as to cover part of that upper surface. The first extending portion 40'*a* refers to that part of the cladding member 40 which is disposed in non-overlapping relation with the through hole 30*a* of the substrate 30 as seen in a plan view. Although this embodiment will be described with respect to the case where the cladding member 40 is so formed as to extend continuously from the inside of the through hole 30*a* to the upper surface 30A for covering part of the upper surface 30A, the cladding member 40 does not need to be extended continuously from the inside of the through hole 30*a*, and it is possible to dispose a portion (in island form) of the cladding member on part of the upper surface 30A instead.

The electrically conductive body 60 may either be so formed as to extend continuously from that part of the upper surface 40A which is disposed in overlapping relation with the through hole 30*a* to an upper surface 40*a*A of the first extending portion 40'*a* or be formed only on the upper surface 40*a*A of the first extending portion 40'*a* as seen in a plan view. By providing the first extending portion 40'*a* in the cladding member 40, it is possible to place the electrically conductive body 60 also in a region in non-overlapping relation with the through hole 30*a* as seen in a plan view. In consequence, the electrical characteristics of the electrically conductive body 60 located in a region in non-overlapping relation with the through hole 30*a* can be improved.

(Modified Example 2 of Optical Transmission Board)

Figure 6:
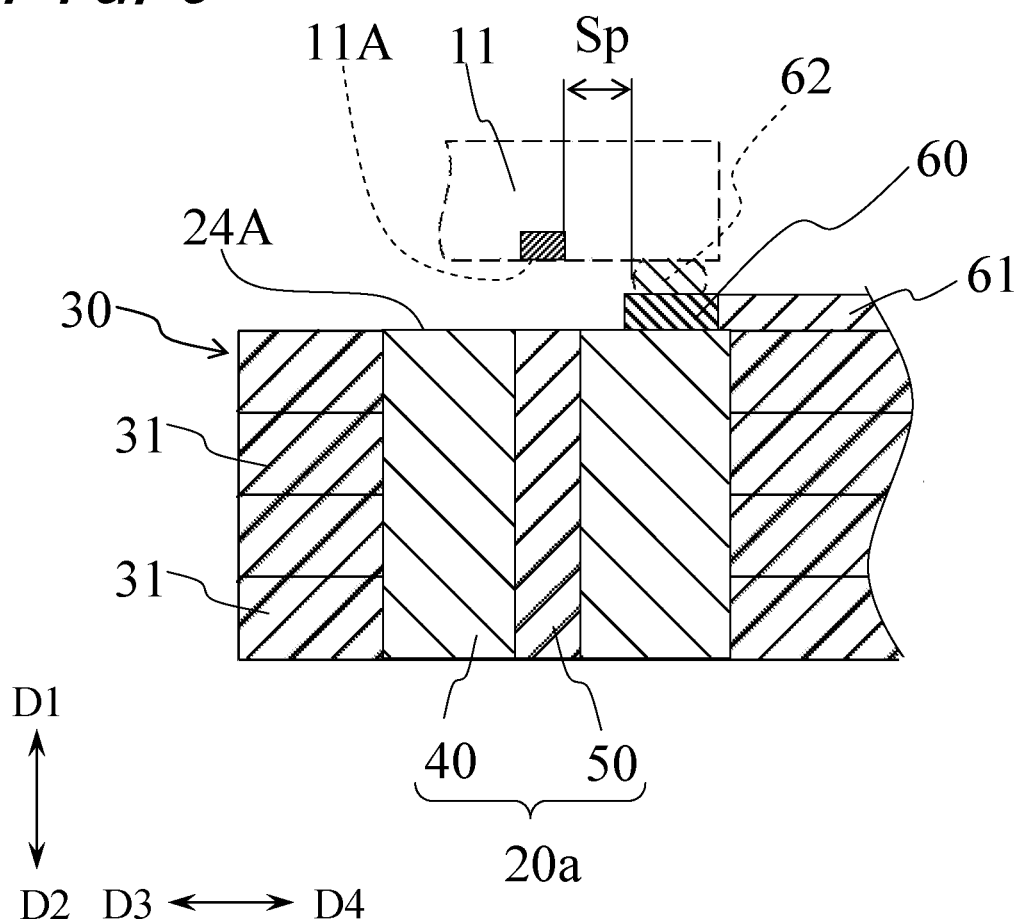
FIG. 6 is a sectional view of a modified example of the first embodiment of the optical transmission board shown in FIG. 4, illustrating a section of the construction taken along the line A-A' shown in FIG. 2 in a partly enlarged manner.

As shown in FIG. 6, the electrically conductive body 60 may be so placed that part of the electrically conductive body 60 locates in overlapping relation with the through hole 30*a* as viewed from above. In the case where the electrically conductive body 60 is disposed in overlapping relation with the through hole 30*a*, the optoelectronic conversion device 11 can be mounted efficiently on the electrically conductive body 60. Specifically, in the case of using a device whose light-receiving or light-emitting surface 11A is capable of proximity to the mounting position as the optoelectronic conversion device 11, excellent mountability can be attained. This will be explained below with reference to FIG. 6. FIG. 6 is a partly enlarged view showing the optical waveguide 20*a*, the substrate 30, the optoelectronic conversion device 11, and so forth.

In a conventional optical transmission board constructed to mount an optoelectronic conversion device on a substrate, it is necessary to adjust the position of a core member in accordance with the distance between the light-receiving or light-emitting surface of the optoelectronic conversion device and the mounting position, which led to poor flexibility in the design of an optical waveguide. That is, a restriction is imposed on the position of the core member with consideration given to the distance between the light-receiving or light-emitting surface of the optoelectronic conversion device and the mounting position.

On the other hand, in the optical transmission board 20 of this embodiment, since the electrically conductive body 60 formed on the cladding member 40 can be placed close to the core member, even if the distance Sp between the light-receiving or light-emitting surface 11A of the optoelectronic conversion device 11 and the mounting position is small, it is possible to reduce the need for adjustment to the position of the core member 50. Accordingly, additional freedom of choice in light-emitting devices and light-receiving devices used for the optoelectronic conversion device 11, or greater flexibility in the design of the optical transmission board can be attained. As a result, the optical transmission board 20 can be designed to provide greater versatility.

(Modified Example 3 of Optical Transmission Board)

Figure 7:
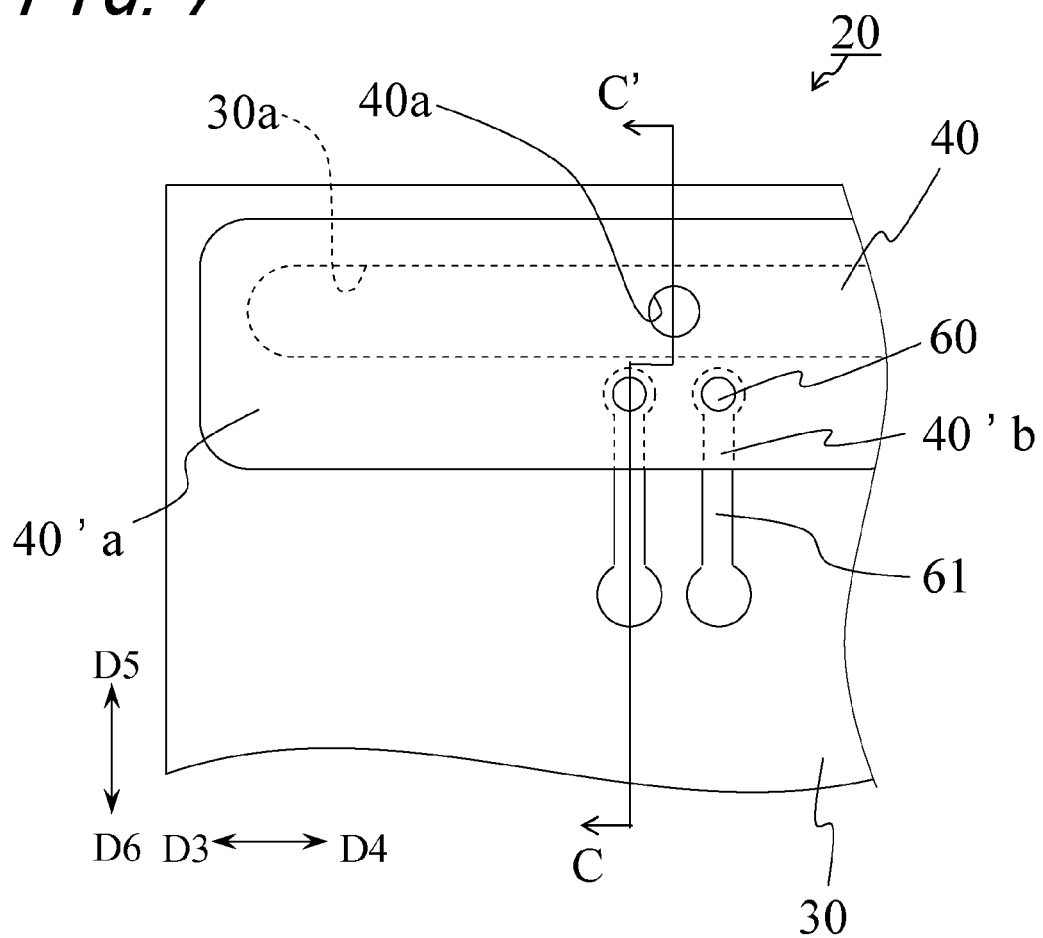
FIG. 7 is a plan view showing a modified example of the optical transmission board shown in FIG. 3.
Figure 8:
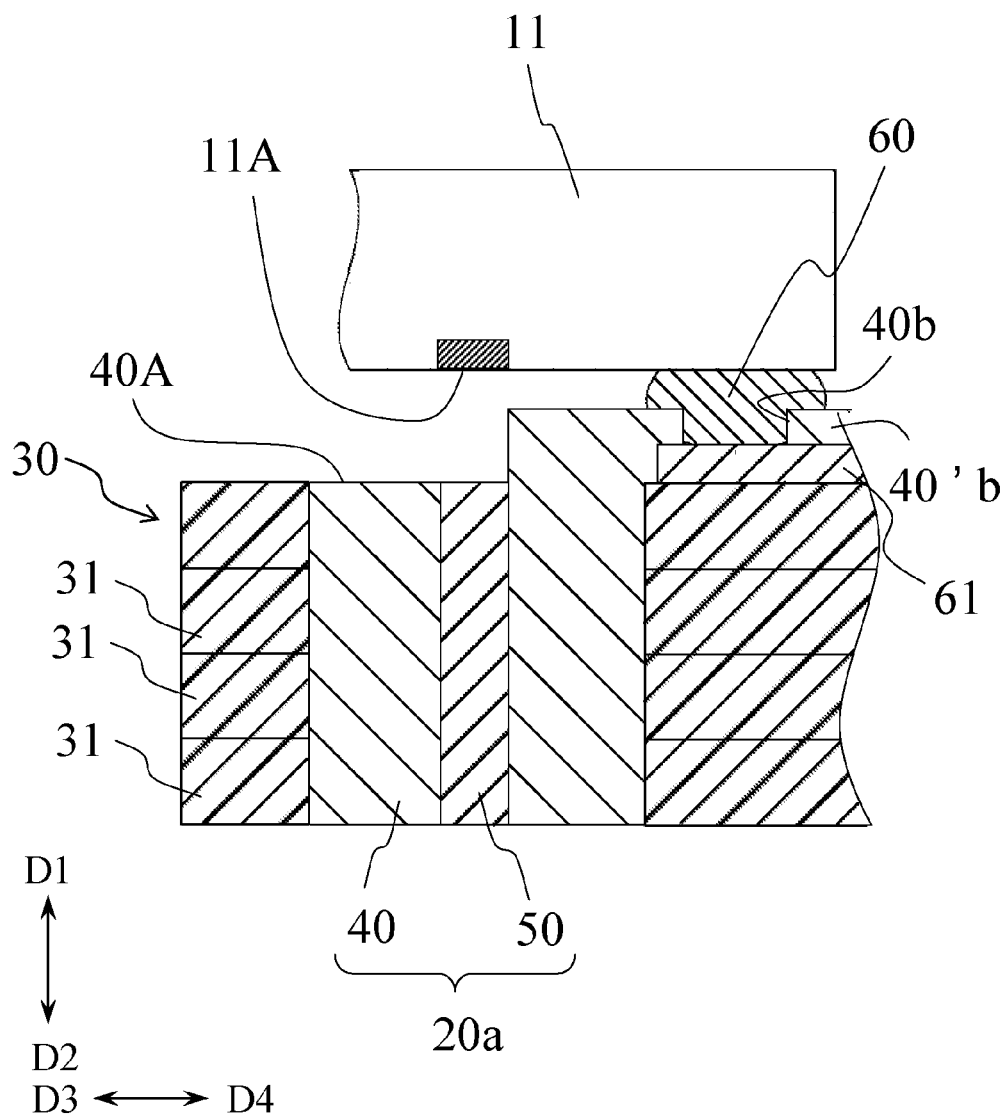
FIG. 8 is an enlarged sectional view of part of the optical transmission board shown in FIG. 7, illustrating a section of the construction taken along the line C-C' shown in FIG. 7.
Figure 9:
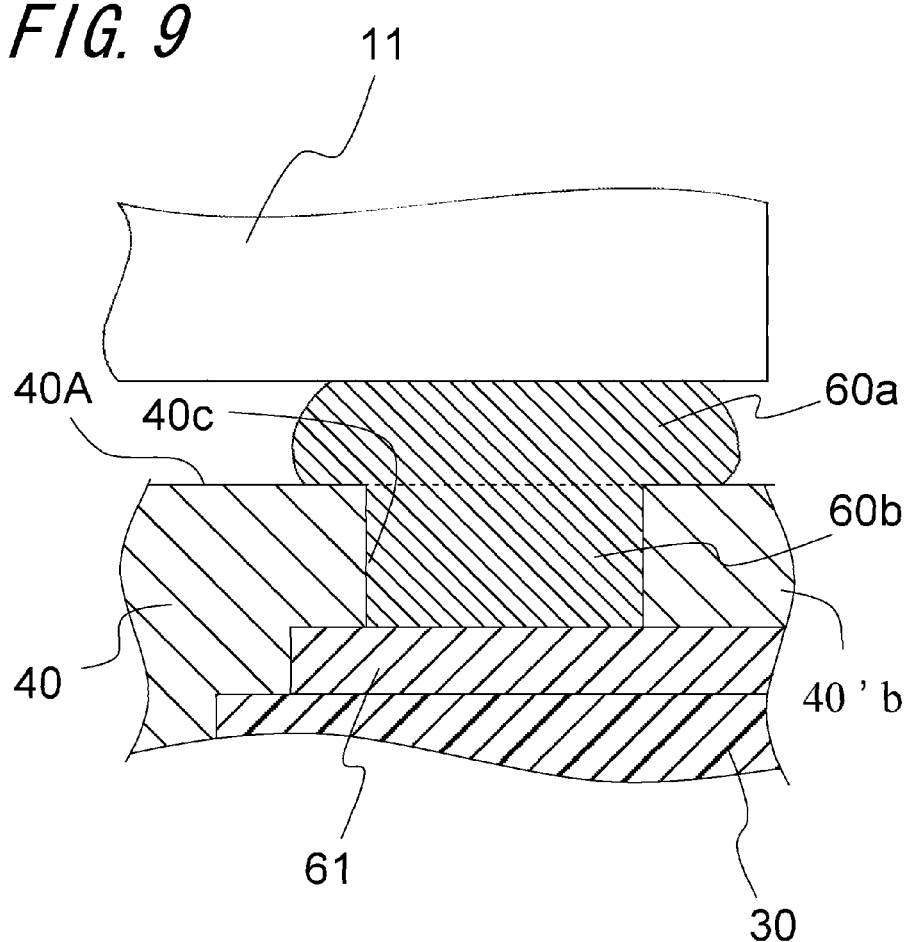
FIG. 9 is an enlarged sectional view showing part of the optical transmission board shown in FIG. 7.

As shown in FIGS. 7 to 9, the board 20 includes an electric wiring 61 disposed on an upper surface 20A of the substrate 20, and the cladding member 40 may further include a second extended portion 40*b* extending continuously from the inside of the through hole 30*a* to the electric wiring 61 so as to cover part of the electric wiring 61. Moreover, the second extended portion 40*b* is provided with a cladding through hole 40*c* formed in the thickness direction of the substrate 30 so as to penetrate from top to bottom of the second extended portion 40*b*, and the electrically conductive body 60 further includes a through conductor 60*a* connected to the electric wiring 61 while being located through the cladding through hole 40*c*.

The second extended portion 40*b* is that part of the cladding member 40 which is disposed in overlapping relation with part of the electric wiring 61 disposed on the upper surface 20 of the board 20 (the first extending portion 40'*a*). The second extended portion 40*b* may be so formed as to extend continuously from the inside of the through hole 30*a* to the electric wiring 61 for covering part of the electric wiring 61, yet does not need to be extended continuously from the inside of the through hole 30*a*. The second extended portion 40*b* can be so designed that its thickness from the upper surface of the electric wiring 61 falls in the range of 0.1 μm or more and 50 μm or less.

It is sufficient that the cladding through hole 40*c* is disposed so that part of the cladding through hole 40*c* locates in overlapping relation with the electric wiring 61 as seen in a plan view. The cladding through hole 40*c* can be so designed that its diameter falls in the range of 0.5 μm or more and 100 μm or less, for example. The cladding through hole 40*c* is positioned so that the electric wiring 61 can be left exposed at the second extended portion 40*b*. The cladding through hole 40*c* may have the shape of a circular cylinder, the shape of a polygonal column such as a quadrangular prism, the shape of a circular cone, the shape of a polygonal pyramid, or other shape. In the case where the circular cone or polygonal pyramid whose bottom facing the electric wiring 61 is employed as the shape of the cladding through hole 40*c*, in placing the through conductor 60*a* in the cladding through hole 40*c*, the through conductor 60*a* can be hard to come out of the cladding through hole.

The electrically conductive body 60 is connected to the electric wiring 61 while being located through the cladding through hole 40*c*. Now, the concrete description thereof will be given with reference to FIG. 9. The electrically conductive body 60 is disposed on part of the upper surface 40A of the cladding member 40 so as to be electrically connected to the electric wiring 61 while being located through the cladding through hole 40c. In this construction, the "electrically conductive body" disposed on the upper surface 40A of the cladding member 40 refers to an electrically conductive body portion 60a disposed on the cladding member 40. The through conductor 60b, which is provided to establish electrical connection between the electrically conductive body portion 60a and the electric wiring 61, is disposed inside the cladding through hole 40c. The through conductor 60b may either be located so as to fill the cladding through hole 40c or be located so as to secure some spacing in the cladding through hole 40c.

The electrically conductive body portion 60a and the through conductor 60b may either be made of the same electrically conducting material or be made of different electrically conducting materials. In the case where the electrically conductive body portion 60a and the through conductor 60b are made of the same electrically conducting material, for example, it is advisable to fill the electrically conducting material until it overflows the cladding through hole 40c and the spillover portion settles on the upper surface 40A of the cladding member 40.

In this embodiment, the electrically conductive body portion 60a is disposed on the upper surface of the second extended portion 40'b. In this case, since the upper surface of the second extended portion 40'b has a surface roughness smaller than that of the electric wiring 61, in contrast to the case where the conductor is disposed entirely on the electric wiring, the electrical characteristics of the electrically conductive body portion 60a can be improved.

(Modified Example 4 of Optical Transmission Board)

The cladding member 40 may be provided with a plurality of optical waveguide holes 40a, and a plurality of core members 50 may be disposed in correspondence with the plurality of optical waveguide holes 40a, respectively, inside their respective optical waveguide holes 40a, and also a plurality of conductive bodies 60 may be arranged in correspondence with the plurality of core members 50, respectively. Moreover, the plurality of conductive bodies 60 have a plurality of optoelectronic conversion devices 11 electrically connected thereto, respectively.

Figure 10:
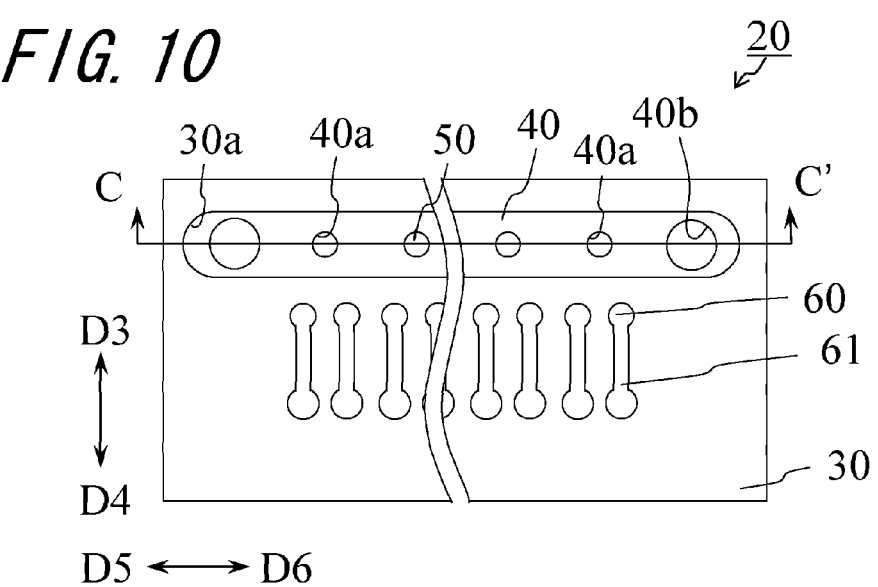
FIG. 10 is a plan view showing a modified example of the optical transmission board shown in FIG. 3.

As shown in FIG. 10, inside the through hole 30a of the substrate 30, there are arranged a plurality of optical waveguides 20a having a plurality of core members 50. That is, in the direction of arrangement of the core members 50 (D5-D6 direction), a plurality of optoelectronic conversion devices 11 are arranged so as to be optically coupled to their respective core members 50. Also in this structure in which the plurality of core members 50 are provided in the optical waveguide 20a, the upper surface 40A of the cladding member 40 has a surface roughness smaller than that of the main surface 30A of the substrate 30. Therefore, even if a plurality of optoelectronic conversion devices 11 are arranged in the arrangement direction, the plurality of optoelectronic conversion devices 11 arranged in the arrangement direction can be mounted on the substrate 30 properly, wherefore high level of mounting accuracy can be ensured for each of the optoelectronic conversion devices 11.

In the case of forming the optical waveguide hole 20a by means of photolithography, for example, the following advantages are gained. The first advantage resides in the effect of minimizing relative positional deviation between a plurality of optical waveguide holes 20a. This is because the plurality of optical waveguide holes 20a can be formed simultaneously by a single exposure process. Minimization of positional deviation in the optical waveguide holes 20a makes it possible to achieve, when establishing optical connection with other different optical waveguide placed in a location spaced outward from the optical transmission board 20, successful transmission of light propagating through the interior of the optical waveguide hole 20a to that different optical waveguide.

In the case of employing photolithography, the positional deviation is dependent on positional deviation in masking portions of a photomask corresponding to the optical waveguide holes 20a. In general, a manufacturing error for the photomask can be kept at a level of less than 1 μm, wherefore the positional deviation in the optical waveguide holes 20a can be easily reduced to the extent of smaller than the diameter of the core member 50.

The second advantage resides in the effect of imparting smoothness to the inner wall of the optical waveguide hole 40a. This is because the optical waveguide hole 20a is formed by exploiting light which travels straightforward with high linearity. By rendering the inner wall surface of the optical waveguide hole 20a smooth, it is possible to lessen losses of light propagating through the interior of the optical waveguide hole 20a. As a knowledge among those skilled in the art, it is preferable that the roughness of the inner wall surface of the optical waveguide hole 40a is sufficiently low with respect to the wavelength of light propagating through the interior of the optical waveguide hole.

(Modified Example 5 of Optical Transmission Board)

Figure 11:
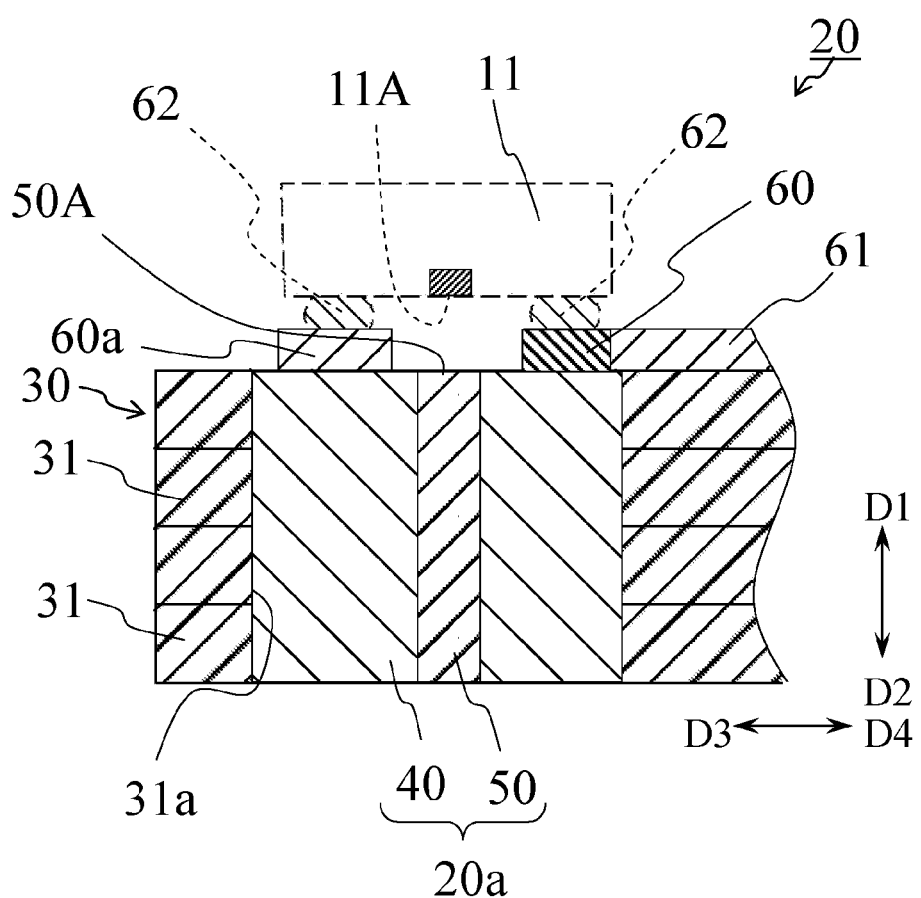
FIG. 11 is an enlarged sectional view of part of the optical transmission board shown in FIG. 7, illustrating a section of the construction taken along the line A-A' shown in FIG. 3.

As shown in FIG. 11, the optical transmission board 20 may include a second electrically conductive body 60a which is placed on the upper surface 40A of the cladding member 40 opposed to the cladding member bearing the electrically conductive body 60, with the core member 50 lying between them. FIG. 11 is a partly enlarged sectional view showing the optical waveguide 20a, the substrate 30, and the optoelectronic conversion device 11. The second electrically conductive body 60a may be kept in electrical isolation without being connected to any terminal. The optoelectronic conversion device 11 is mounted on the second electrically conductive body 60a via a connector 62. In this case, for example, it is advisable to use an electrically conducting layer for the electrically conductive body 60 and the second electrically conductive body 60a as well.

In this way, the optoelectronic conversion device 11 can be secured along the D3-D4 direction so as to straddle the core member 50, wherefore the accuracy of mounting the optoelectronic conversion device 11 can be increased. As a result, the optoelectronic conversion device 11 and the core member 50 can be optically coupled to each other with high efficiency.

The thickness of the second electrically conductive body 60a may be adjusted to be the same as the thickness of the electrically conductive body 60. This helps facilitate the mounting of the optoelectronic conversion device 11 in a manner such that the light-receiving or light-emitting surface 11A and the surface of the cladding member 40 are arranged face to face with each other. That is, the optoelectronic conversion device 11 can be mounted in a state where the light-receiving or light-emitting surface 11A and the upper surface 50A of the core member 50 are substantially horizontal.

Moreover, the second electrically conductive body 60a may be connected to an electric wiring for feeding electric signals for driving the optoelectronic conversion device 11 or may be of a ground terminal. This makes it possible to increase the accuracy of mounting the optoelectronic conversion device 11 while maintaining the number of conductive bodies to be connected to the optoelectronic conversion device 11.

(Modified Example 6 of Optical Transmission Board)

Figure 12:
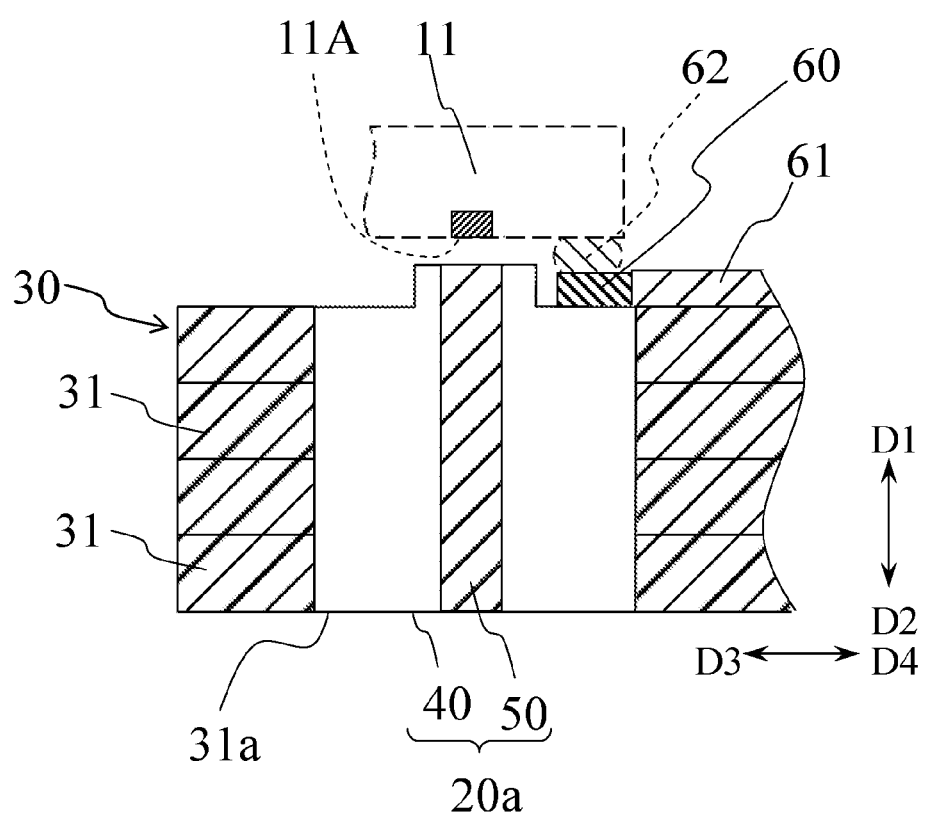
FIG. 12 is an enlarged sectional view of part of the optical transmission board shown in FIG. 7, illustrating the section of the construction taken along the line A-A' shown in FIG. 3.

In the optical transmission board 20, as shown in FIG. 12, adjustment can be made to the distance between part of the end face of the optical waveguide 20a (part of the cladding member 40 including the core member 50) and the light-receiving or light-emitting surface 11A of the optoelectronic conversion device 11. FIG. 12 shows the case where part of the end face of the optical waveguide 20a protrudes toward the light-receiving or light-emitting surface 11A of the optoelectronic conversion device 11. Thus, in the optoelectronic conversion device 11, where the upper surface of the core member 50 is located closer to the light-receiving or light-emitting surface 11A, for example, in effecting optical coupling of the optoelectronic conversion device 11 to the core member 50, it is possible to suppress leakage of the light emitted from the optoelectronic conversion device 11 from the core member 50.

Moreover, as shown in FIG. 12, it is advisable that by arranging a side face of part of the optical waveguide 20a protruding from the upper surface of the optical waveguide 20a away from the electrically conductive body 60, a groove is provided between the side face of the optical waveguide 20a and the electrically conductive body 60. In this case, for example, when the optoelectronic conversion device 11 is mounted with use of an easily-fusible metal member, such as solder, as the connector 62, it is possible to suppress adhesion of the metal member to the core member 50 owing to the groove created between the optical waveguide 20a and the electrically conductive body 60.

(Method for Manufacturing Optical Transmission Board in Accordance with First Embodiment)

Hereinafter, as an example of the method of manufacturing the first optical transmission board pursuant to the invention, a method for manufacturing the optical transmission board 20 will be described with reference to the drawings.

To begin with, there is prepared a substrate 30 being provided with a through hole 30a formed in the thickness direction (the D1-D2 direction) so as to penetrate from top to bottom of the substrate 30. The substrate 30 of this embodiment is produced by performing the following steps. First, as shown in FIG. 13(*a*), there are prepared a plurality of green sheets 31X that are formed into secondary substrates 31 by firing. Next, as shown in FIG. 13(*b*), a sheet hole 31Xa is formed in the green sheet 31X to provide a secondary through hole 31a. Concurrently with the formation of the sheet hole 31Xa, a through hole used for a through conductor of an electric wiring 60 is formed on an as needed basis. Such holes can be made by various methods, for example, by punching out the sheet with a pin or die or by cutting the sheet with laser light. Next, a metal paste for forming the electric wiring 60 is placed on the green sheet 31X.

The metal paste can be formed using, for example, a screen printing technology or an ink jet printing technology. As the metal paste for forming the electric wiring 60, for example, a metal paste containing a metal such as tungsten (W), molybdenum (Mo), manganese (Mn), silver (Ag) and copper (Cu) can be used. Next, as shown in FIG. 13(*c*), the green sheets 31X are laminated such that the sheet holes 31Xa are arranged in a row. Then, by firing the laminated green sheets 31X, as shown in FIG. 13(*d*), the substrate 30 having the through hole 30a is formed. By firing the metal paste along with firing the green sheet 31X, the electric wiring 60 is formed. Then, as shown in FIG. 14(*a*), the through hole 30a of the substrate 30 is filled with a photosensitive material 40X that can be formed into a cladding member 40 by curing. When the photosensitive material 40X is filled into the through hole 30a of the substrate 30, the photosensitive material 40X is applied so as to cover the electric wiring 61. Examples of the photosensitive material include an epoxy resin-based material, an acrylic resin-based material, and a polyimide resin-based material. In this embodiment, a negative photoresist whose solubility in a developer solution is decreased through exposure to light is adopted.

Then, following the heating (pre-baking) of the photosensitive material 40X, the pre-baked photosensitive material 40X is exposed to light. In the time of exposure, there is used a light-shielding plate 45 such as a photomask having a plurality of light-shielding sections for shielding light in order not to irradiate a region for forming an optical waveguide hole 40a with light. By means of such a photomask, a region of the pre-baked photosensitive material 40X other than the region in overlapping relation with the above-described light-shielding portion is exposed to light.

Then, after the photosensitive material 40X is heated (pre-baked), as shown in FIG. 14(*b*), the pre-baked photosensitive material 40X is exposed. In the time of exposure, there is used a light-transmitting plate 45 such as a photomask having a plurality of light shielding portions for shielding light in order not to irradiate a region for forming the optical waveguide hole 20a with light Lh.

Specifically, the light-shielding plate 45 has a first light-shielding section 45a which is brought into overlapping relation with part of the through hole 30a and a second light-shielding section 45b spaced away from the first light-shielding section 45a. It is advisable that the first light-shielding section 45a and the second light-shielding section 45b are arranged in correspondence with the optical waveguide hole 40a and the cladding through hole 40c, respectively. In forming the first light-shielding section 45a and the second light-shielding section 45b, their thickness and materials used for them can be selected arbitrarily so long as they are made impervious to passage of light Lh, for example, the transmittance thereof falls in the range of 0.5% or more and 20% or less.

Through such a light-shielding plate 45, light is applied to the pre-baked photosensitive material 40X in a manner such that regions of the filled photosensitive material 40X other than the regions thereof in overlapping relation with the first light-shielding section 45a and the second light-shielding section 45b can be exposed to light. By doing so, the photosensitive material 40X can be turned into a cladding member having unexposed portions corresponding to the first light-shielding section 45a and the second light-shielding section 45b.

As a light source in the time of exposure, for example, lamps of various types, laser light, electron beams or the like can be adopted. It is advisable to select the light source with consideration given to the material properties of the photosensitive material 40X. In the case of using parallel light (light parallel to the thickness direction of the substrate 30) as the light Lh which travels through the light-shielding plate 45, since the light is less prone to being diffracted by the light-shielding section, it is possible to form the unexposed portions for forming the optical waveguide hole 40a and the cladding through hole 40c with high accuracy.

Next, the exposed photosensitive material 40X is heated (post-baked). Then, the post-baked photosensitive material 40X is developed by a developer solution so that the exposed photosensitive material 40X can be turned into the cladding member 40, whereupon, as shown in FIG. 15(*a*), the cladding member 40 provided with the optical waveguide hole 40a and the cladding through hole 40c is formed. After that, the part of the photosensitive material 40X other than the part thereof which has been turned into the cladding member 40 (the unexposed portion of the photosensitive material 40X) is removed, and eventually there is formed the cladding member 40 being provided with the optical waveguide hole 40a penetrating in the thickness direction thereof and the cladding through hole 40c for keeping the upper surface of the electric wiring 60 exposed. Note that the optical waveguide hole 40a is formed so as to be brought into correspondence with the position of the first light-shielding section 45a, and the cladding through hole 40c is formed so as to be brought into correspondence with the position of the second light-shielding section 45b.

Since the cladding member 40 is formed by curing the photosensitive material 40X, it follows that the upper surface 40A of the cladding member 40 becomes flatter than the substrate 30. Note that the upper surface 40A of the cladding member 40 may be polished by means of, for example, chemical mechanical polishing for further planarization of the upper surface 40A.

Next, a light-transmitting material for forming a core member 50 is filled into the optical waveguide hole 40a of the cladding member 40. After that, the filled light-transmitting material is cured by means of application of light having a predetermined wavelength, baking, or otherwise, thereby forming the core member 50 as shown in FIG. 15(b).

Next, an electrically conducting material is filled into the cladding through hole 40c. By doing so, the through conductor 60b can be formed inside the cladding through hole 40c. As the method of forming the through conductor 60b by filling, for example, screen printing technology or ink jet printing technology can be employed. Thus, since the electrically conductive body 60 is obtained by filling the electrically conducting material into the cladding through hole 40c, it is possible to establish electrical connection between the electrically conductive body 60 and the electric wiring 61 without fail.

After that, the optoelectronic conversion device 11 is mounted on the electrically conductive body 60 via the electrically conductive body 60 or the connector 62. The connector 62 may be formed in advance in the optoelectronic conversion device 11, and in this case the optoelectronic conversion device 11 is mounted on the electrically conductive body 60 so that the connector 62 can be abutted on the electrically conductive body 60. The transverse width of the connector 62 can be adjusted to fall in the range of 3 μm or more and 60 μm or less. Note that a flux or the like which adheres firmly to the connector 62 may be formed in advance on the electrically conductive body 60.

The optoelectronic conversion device 11 is mounted while being positioned by means of passive alignment using an alignment marker formed on the main surface 30A of the substrate 30, for example. For example, the electrically conductive body 60 can be utilized as the alignment marker. The electrically conductive body 60 can be formed in conformity with the position of the core member 50, wherefore the accuracy of positioning relative to the core member 50 can be increased. The connector 62, which acts to establish electrical connection between the optoelectronic conversion device 11 and the electrically conductive body 60 as well as to secure both of them, can be made of a material containing solder, for example. Upon completion of such a procedure, the optical transmission board 20 can be produced.

<Optical Transmission Module>

In the optical transmission module 10 according to an embodiment of the invention, as shown in FIGS. 1 and 2, the optical transmission board 20 includes a circuit component 12 electrically connected to the electrically conductive body 60. The optical transmission board 20 and the circuit component 12 are electrically connected to each other via the electrically conductive body 60 and the electric wiring 61.

The circuit component 12 is electrically connected to the optoelectronic conversion device 11 through the electric wiring 60. A function of the circuit component 12 varies according to a function of the optoelectronic conversion device 11. Where the optoelectronic conversion device 11 functions to emit light, the circuit component 12 effects inputting of a modulated electric signal (modulation voltage) to the optoelectronic conversion device 11 for control of the luminescence intensity of the optoelectronic conversion device 11. On the other hand, where the optoelectronic conversion device 11 functions to receive light, the circuit component 12 converts the output of a current signal produced responsive to the intensity of an optical signal received by the optoelectronic conversion device 11 into a voltage signal and produces the voltage signal output.

The circuit component 12 may have the capability to control signal waveforms or the capability to remove noise components. In a case where electric-signal output from the optoelectronic conversion device 11 is small, it is advisable to impart signal amplification capability to the circuit component 12. This signal amplification capability may be possessed by the optoelectronic conversion device 11 in itself. Moreover, the circuit component 12 may also have the capability to perform logic operations and mathematical calculations.

(Modified Example of Optical Transmission Module)

As shown in FIG. 16(a), the circuit component 12 may be placed so as to locate astride the substrate 30 and the optical waveguide 20a. Specifically, the electrically conductive body 60 and the electric wiring 61 are disposed on the upper surface 40A of the cladding member 40, and a mounting electrode 63 for mounting part of the circuit component 12 is disposed on the main surface 30A of the substrate 30.

In this case, as shown in FIG. 16(b), the through hole 30a of the substrate 30 is made large enough for the electrically conductive body 60 and the electric wiring 61 to be placed on the upper surface 40A of the cladding member 40. Thus, the circuit component 12 is placed so as to locate astride the substrate 30 and the cladding member 40 of the optical waveguide 20a, and therefore, even if the electrically conductive body 60 and the electric wiring 61 undergo thermal expansion, thermal shrinkage, etc. repeatedly, since the electrically conductive body 60 and the electric wiring 61 are formed so as to locate only on the cladding member 40 (do not locate on the main surface 30A of the substrate 30), it is possible to suppress occurrence of thermal stress between the electrically conductive body 60 as well as the electric wiring 61 and the substrate 30.

<Second Embodiment of Optical Transmission Board and Optical Transmission Module>

Hereinafter, as the second embodiment of the optical transmission module pursuant to the invention, an optical transmission module 10' will be illustrated with reference to the drawings.

Figure 17:
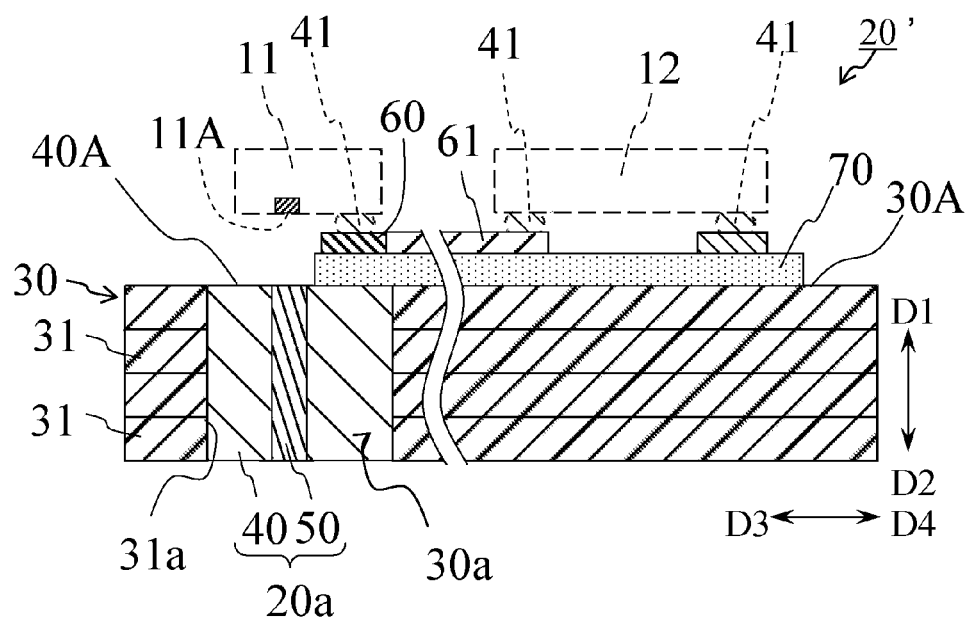
FIG. 17 is a sectional view of the optical transmission board in accordance with a second embodiment of the invention, illustrating the section of the construction taken along the line A-A' shown in FIG. 3.

The optical transmission module 10' as shown in FIG. 17 includes an optical transmission board 20, an optoelectronic conversion device 11 provided as an optical element, and a circuit component 12. The optoelectronic conversion device 11, as well as the circuit component 12, is constitutionally similar to that as particularized hereinabove, and the description thereof will therefore be omitted.

Major differences of the optical transmission board 20' shown in FIG. 17 from the foregoing construction are: the provision of an intermediate layer disposed on the upper surface 40A of the cladding member 40, the upper surface of which has a surface roughness smaller than that of the upper surface 30A of the substrate 30; and the placement of the electrically conductive body 60 on the upper surface 70 of the intermediate layer 70. Moreover, in the optical transmission board 20' of this embodiment, in contrast to the optical transmission board 20' of the first embodiment, the upper surface 40A of the cladding member 40 does not necessarily have to have a surface roughness smaller than that of the upper surface 30A of the substrate 30. Other components of the optical transmission board 20' are identical to those of the optical transmission board 20, and descriptions thereof will thus be omitted.

As shown in FIG. 17, the intermediate layer 70 may be so formed as to extend from the upper surface 40A of the cladding member 40 to the main surface 30A of the substrate 30. The intermediate layer 70 is so designed that its thickness from the main surface 30A of the substrate 30 falls in the range of 1 μm or more and 100 μm or less, for example. The intermediate layer 70 may either be formed so as to locate only on the upper surface 40A of the cladding member 40 or be formed so as to extend continuously from the upper surface 40A of the cladding member 40 to the upper surface 30A of the substrate 30 for covering part of the upper surface 30A thereby providing a third extending portion 40'c. Note that the third extending portion 70'a refers to that part of the intermediate layer 70 which is disposed in non-overlapping relation with the through hole 30a of the substrate 30. This embodiment will be described with respect to the case where the third extending portion 70'a is provided.

The intermediate layer 70 is so designed that its upper surface 70A has a surface roughness smaller than that of the main surface 30A of the substrate 30. It is sufficient that the ten-point average height Rz of the intermediate layer 70 is adjusted to be smaller than the ten-point average height Rz of the main surface 30A of the substrate 30, and therefore, for example, the ten-point average height Rz of the intermediate layer 70 can be adjusted to be less than or equal to 0.5 μm. The reason why the intermediate layer 70 has a surface roughness smaller than that of the main surface 30A of the substrate 30 is because the intermediate layer 70 is made of a resin material such as epoxy resin. This is presumably because, due to baking of the resin material, the resin material is cured with its surface roughness kept small.

For example, epoxy resin or polyimide resin can be used for the intermediate layer 70. In the case of using epoxy resin for the intermediate layer 70, where the cladding member 40 is made of an epoxy resin-based material, it is possible to suppress occurrence of thermal stress between the intermediate layer and the cladding member 40. On the other hand, in the case of using polyimide resin for the intermediate layer 70, since the polyimide resin exhibits high affinity for a metal material, it is possible to form the electrically conductive body 60 on the intermediate layer 70 satisfactorily and thereby suppress separation of the wiring conductor 60, with a consequent enhancement in the reliability of the optical transmission board 20'.

In the optical transmission board 20' of this embodiment, the electrically conductive body 60 is disposed on the upper surface 40A of the cladding member 40. Accordingly, the position of the optoelectronic conversion device 11 relative to the core member 50 can be controlled by making adjustment to, for example, the position of the cladding member 50 and the position of the electrically conductive body 60 relative to the core member 50, and this allows greater flexibility in the design of the optical transmission board.

Moreover, the optical transmission board may have a structure in which the electrically conductive body 60 is disposed on the upper surface 70A of the intermediate layer 70. With such a structure, since the upper surface 70A of the intermediate layer 70 has a surface roughness smaller than that of the upper surface 30A of the substrate 30, the electrical characteristics and high-frequency characteristics of the electrically conductive body 60 disposed on the upper surface 70A of the intermediate layer 70 can be improved.

By contrast, in an optical transmission board constructed to form an electrically conductive body on a substrate, the electrically conductive body for mounting an optical element is disposed on the substrate. In this construction, the upper surface of the substrate has a high degree of surface roughness, wherefore the current density of electric current flowing through the electrically conductive body is prone to fluctuations at the interface with the substrate, which makes it difficult to achieve improvement in electrical characteristics and high-frequency characteristics. Furthermore, since the degree of surface roughness of the upper surface of the substrate is high, it is difficult to make an electric wiring finer, which gives rise to the possibility that electrical resistance is increased with the reduction in size.

In this embodiment, the optical transmission board 20' may be so designed that the cladding member 40 is provided with a plurality of optical waveguide holes 40a and a plurality of first core members 50 are disposed in correspondence with the plurality of optical waveguide holes 40, respectively, inside their respective optical waveguide holes 40a, that a plurality of conductive bodies 60 are arranged in correspondence with the plurality of first core members 50, respectively, and that the optical transmission board 20' has a plurality of optoelectronic conversion devices 11 connected to the plurality of conductive bodies 60, respectively.

(Modified Example 1 of Optical Transmission Board of Second Embodiment)

Figure 18:
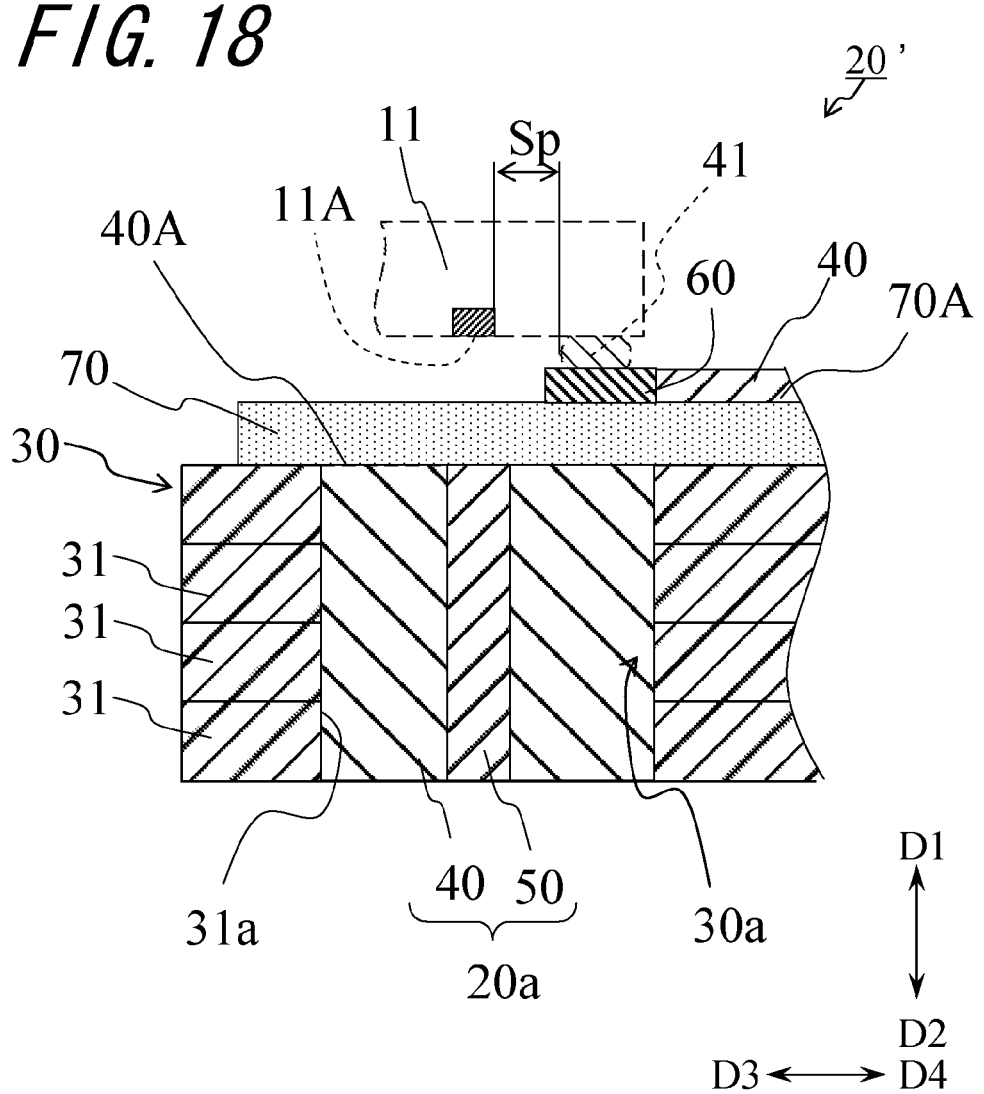
FIG. 18 is an enlarged sectional view showing a modified example of the optical transmission board shown in FIG. 17, illustrating the section of the construction taken along the line A-A' shown in FIG. 3.

As shown in FIG. 18, the intermediate layer 70 is made of a light-transmitting material, and may further include a fourth extending portion 70'b extending continuously from the upper surface 40A of the cladding member 40 to the upper surface 50A of the first core member 50 so as to cover the upper surface 50A. The fourth extending portion 70' refers to that part of the intermediate layer 70 which is disposed in overlapping relation with the first core member 50.

In the case of forming the intermediate layer 70 from a light-transmitting material, even if the intermediate layer covers the upper surface 50A of the first core member 50, the optoelectronic conversion device 11 and the first core member 50 can be optically connected to each other, wherefore the intermediate layer 70 can be provided with ease. Moreover, the entire electric wiring 61 can be readily disposed on the intermediate layer 70. In the case where the entire electric wiring 61 is disposed on the intermediate layer 70, the high-frequency characteristics of the electric wiring 61 can be improved.

For example, it is advisable to apply the material of formation of the intermediate layer 70 in such a way as to cover the upper surface 30A of the substrate 30, the upper surface 40A of the cladding member 40, and the upper surface 50A of the first core member 50 in order to form the intermediate layer 70. By doing so, the intermediate layer 70 can be provided with ease, with a consequent enhancement in design flexibility.

(Modified Example 2 of Optical Transmission Board of Second Embodiment)

Figure 19:
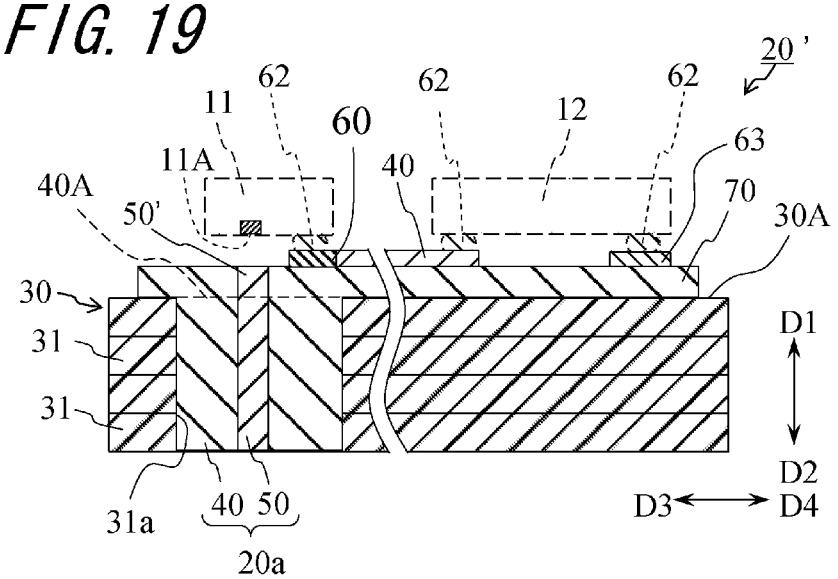
FIG. 19 is an enlarged sectional view showing a modified example of the optical transmission board shown in FIG. 17, illustrating the section of the construction taken along the line A-A' shown in FIG. 3.

As shown in FIG. 19, the intermediate layer 70 may be made of the same material as that used for the cladding member 40. In FIG. 19, the intermediate layer 70 is provided with a second optical waveguide hole 70a which is continuous with the optical waveguide hole 40a, and the inside of the second optical waveguide hole 70a is filled with a second core member 50'. The second core member 50' may either be made of the same material as that used for the core member 50 or be made of a material different from the material used for the core member 50'.

In the case of forming the second core member 50' of the same material as that used for the core member 50, the second core member 50' can be filled into the second optical waveguide hole 70a in the process of filling the core member 50 into the optical waveguide hole 40a, with a consequent increase in productivity. On the other hand, in the case of forming the second core member 50' of a material different from the material used for the core member 50, it is possible to make adjustment to light incident on the optoelectronic conversion device 11 and the core member 50, with a consequent enhancement in design flexibility. This embodiment will be described with respect to the case where the core member 50 and the second core member 50' are made of the same material.

Thus, by forming the intermediate layer 70 of the same material as that used for the cladding member 40, it is possible to facilitate the formation of the intermediate layer 70. That is, since the intermediate layer 70 can be produced in an integral manner at the time of the formation of the optical waveguide 20a, even if the formation of the intermediate layer 70 is added, the optical transmission board 20' can be manufactured without the necessity of increasing the number of process steps.

(Modified Example 3 of Optical Transmission Board of Second Embodiment)

Figure 20:
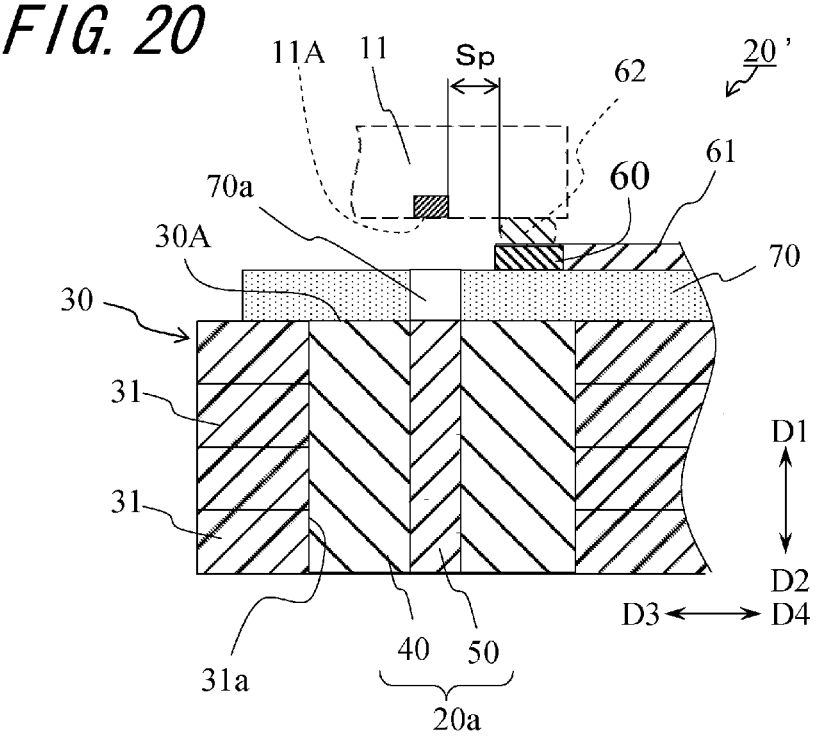
FIG. 20 is an enlarged sectional view showing a modified example of the optical transmission board shown in FIG. 17, illustrating the section of the construction taken along the line A-A' shown in FIG. 3.

As shown in FIG. 20, the intermediate layer 70 may be provided with a second optical waveguide hole 70a formed in the thickness direction of the substrate 30 so as to penetrate from top to bottom of the intermediate layer 70, which is continuous with the optical waveguide hole 40a. The intermediate layer 30 may be provided with a second optical waveguide hole 70a which is formed over the entire upper surface 40A of the optical waveguide 40a and penetrates in the thickness direction, the second optical waveguide hole 70a being continuous with the optical waveguide hole 40a. As used herein, the expression "being continuous with" is construed as encompassing the case where the optical waveguide hole 40a and the second optical waveguide hole 70a may be partly continuous with each other for penetration.

In this embodiment, the second optical waveguide hole 70a is so configured that its inner side surface is continuous with the inner side surface of the optical waveguide hole 40a. By designing the inner side surface of the second optical waveguide hole 70a in that way, it is possible to form the second optical waveguide hole 70a in the intermediate layer 70 concurrently with the formation of the optical waveguide hole 40a in the cladding member 40 at one time, and thereby suppress an increase in the number of process steps even with the formation of the second optical waveguide hole 70a. Note that the intermediate layer 70 may be formed after the formation of the optical waveguide 20a. In this case, it is possible to make a difference between the diameter of the optical waveguide 20a and the diameter of the second optical waveguide 20b with ease.

Figure 21:
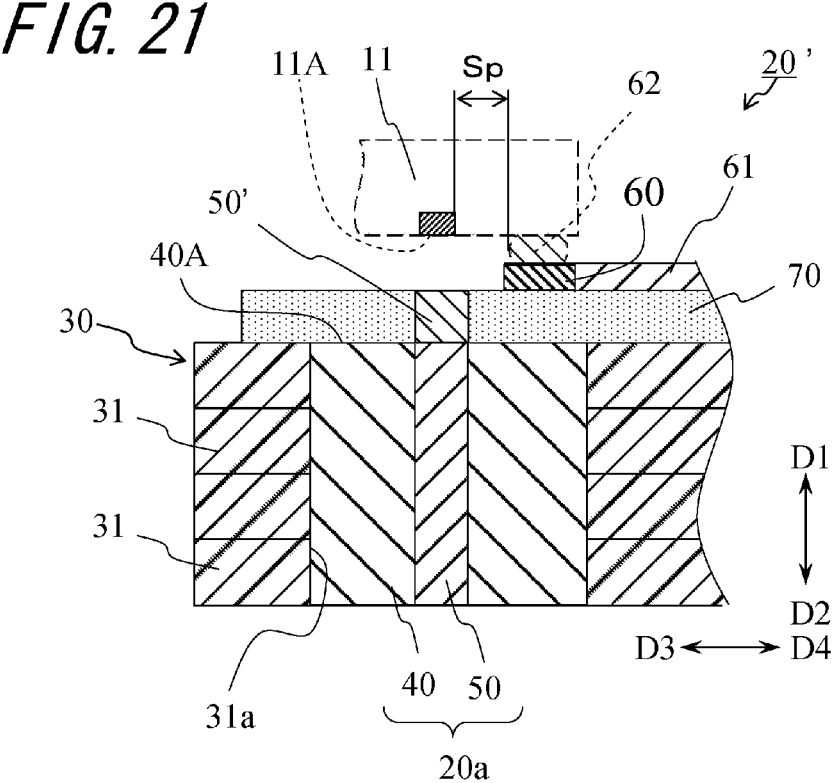
FIG. 21 is an enlarged sectional view showing a modified example of the optical transmission board shown in FIG. 17, illustrating the section of the construction taken along the line A-A' shown in FIG. 3.

Inside such a second optical waveguide 70a, as shown in FIG. 21, a second core member 50' may be placed. In the second core member 50', its refractive index may be so determined that the relative refractive index difference between the second core member and the intermediate layer 70 falls in the range of 0.8% or more and 4% or less. In the case of placing the second core member 50' inside the second optical waveguide 20b, light can be readily reflected at the interface between the second core member 50' and the intermediate layer 70, and it is possible to facilitate incidence of light on the core member 50 or the light-receiving or light-emitting surface 11A.

Moreover, the second core member 50' may be made of the same material as that used for the core member 50. In the case of forming the second core member 50' of such a material, light is less likely to be reflected at the interface between the second core member 50' and the core member 50. In consequence, for example, where the optoelectronic conversion device 11 is a light-emitting device, the light emitted therefrom is less likely to return to the light-receiving or light-emitting surface 11A.

(Modified Example 4 of Optical Transmission Board of Second Embodiment)

Figure 22:
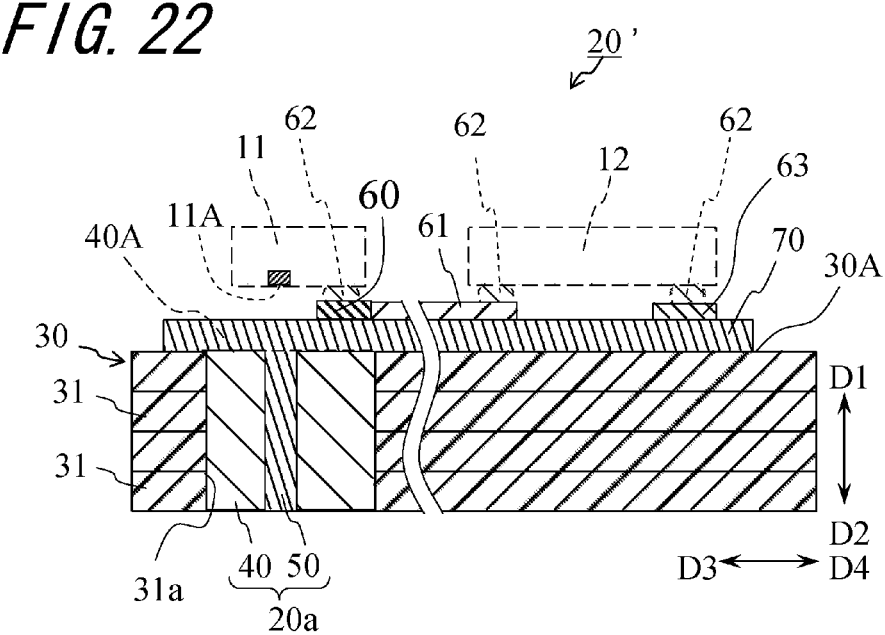
FIG. 22 is an enlarged sectional view showing a modified example of the optical transmission board shown in FIG. 17, illustrating the section of the construction taken along the line A-A' shown in FIG. 3.

In the optical transmission board 20', as shown in FIG. 22, the intermediate layer 70 may be made of the same material as that used for the core member 50. In order to form such an intermediate layer 70, following the formation of the cladding member 40 bearing the optical waveguide hole 40a inside the through hole 30a of the substrate 30, a thin film which will serve as the intermediate layer 70 is formed on the cladding member 40 and the main surface 30A of the substrate 30 while the core member 50 is being filled into the optical waveguide hole 40a. By curing the thin film, the core member 50 and the intermediate layer 70 can be formed.

That is, after the cladding member 40 is cured, the core member 50 and the thin film which will serve as the intermediate layer 70 are formed and cured. In this case, the thin film which will serve as the intermediate layer 70 is cured while being supported on the cladding member 40, wherefore it is possible to suppress deformation of the intermediate layer 70.

It should be understood that the application of the invention is not limited to the embodiments as described heretofore, and that many modifications and variations of the invention are possible without departing from the scope of the invention.

While, in the method for manufacturing the optical transmission board 20 thus far described, a negative photoresist is adopted, it is possible to adopt instead a positive photoresist whose solubility in a developer solution is increased through exposure to light. In the case of using the positive photoresist, regions to be exposed to light need to be changed correspondingly.

While the above-described method for manufacturing the optical transmission board 20 is directed to the adoption of a ceramic substrate for the substrate 30, it is possible to produce the optical transmission board with use of an organic substrate. In the case of producing the optical transmission board with use of an organic substrate, it is advisable that, after the stacking together of secondary substrates, the resultant base is subjected to a punching process to form through holes in the substrate. In the case of punching out the secondary substrates en masse, positional deviation between secondary through holes can be minimized.

The invention claimed is:
1. An optical transmission board, comprising:
   a substrate being provided with a through hole formed in a thickness direction of the substrate so as to penetrate from top to bottom;
   a cladding member at least part of which locates inside the through hole,
comprising an optical waveguide hole being inside the through hole and penetrating the cladding member in the thickness direction thereof, and
comprising an upper surface having a surface roughness smaller than that of an upper surface of the substrate;

a core member disposed inside the optical waveguide hole;
an electrically conductive body disposed on the upper surface of the cladding member; and
an optical element electrically connected to the electrically conductive body, comprising a light-receiving surface or a light-emitting surface opposed to an upper surface of the core member.

2. The optical transmission board according to claim 1, wherein the cladding member further comprises a first extended portion extending continuously from an inside of the through hole to the upper surface of the substrate so as to cover part of the upper surface of the substrate.

3. The optical transmission board according to claim 1, wherein the electrically conductive body comprises a part of the electrically conductive body, the part of the electrically conductive body being lapped over the through hole as viewed from above.

4. The optical transmission board according to claim 1, wherein the substrate further comprises an electric wiring disposed on the upper surface of the substrate,
the cladding member further comprises a second extended portion extending continuously from an inside of the through hole to the electric wiring so as to cover part of the electric wiring,
the second extended portion is provided with a cladding through hole formed in the thickness direction of the substrate so as to penetrate from top to bottom of the second extended portion, and
the electrically conductive body further comprises a through conductor connected to the electric wiring while being located through the cladding through hole.

5. The optical transmission board according to claim 1, wherein the upper surface of the cladding member is in plane with the upper surface of the core member.

6. The optical transmission board according to claim 1, wherein the cladding member is provided with a plurality of the optical waveguide holes,
a plurality of the core members are disposed in correspondence with the plurality of the optical waveguide holes, respectively, inside their respective optical waveguide holes,
a plurality of the conductive bodies are arranged in correspondence with the plurality of the core members, respectively, and
the optical transmission board comprises a plurality of the optical elements electrically connected to the plurality of the conductive bodies, respectively.

7. An optical transmission board, comprising:
a substrate being provided with a through hole formed in a thickness direction of the substrate so as to penetrate from top to bottom;
a cladding member at least part of which locates inside the through hole, and comprising an optical waveguide hole being inside the through hole and penetrating the cladding member in the thickness direction thereof;
a first core member disposed inside the optical waveguide hole;
an intermediate layer disposed on an upper surface of the cladding member, comprising an upper surface having a surface roughness smaller than that of an upper surface of the substrate;
an electrically conductive body disposed on the upper surface of the intermediate layer; and
an optical element electrically connected to the electrically conductive body, comprising a light-receiving surface or a light-emitting surface opposed to an upper surface of the first core member.

8. The optical transmission board according to claim 7, wherein the intermediate layer further comprises a third extended portion extending continuously from the upper surface of the cladding member to the upper surface of the substrate so as to cover part of the upper surface of the intermediate layer.

9. The optical transmission board according to claim 7, wherein the intermediate layer is made of a light-transmitting material, and further comprises a fourth extended portion extending continuously from the upper surface of the cladding member to the upper surface of the first core member so as to cover the upper surface of the intermediate layer.

10. The optical transmission board according to claim 7, wherein the intermediate layer is made of a same material as that used for the cladding member.

11. The optical transmission board according to claim 7, wherein the intermediate layer is provided with a second optical waveguide hole formed in the thickness direction of the substrate so as to penetrate from top to bottom of the intermediate layer, the second optical waveguide hole being continuous with the optical waveguide hole.

12. The optical transmission board according to claim 11, wherein the intermediate layer further comprises a second core member disposed inside the second optical waveguide hole.

13. The optical transmission board according to claim 12, wherein the second core member is made of a same material as that used for the first core member.

14. The optical transmission board according to claim 7, wherein the cladding member is provided with a plurality of the optical waveguide holes,
a plurality of the first core members are disposed in correspondence with and inside the plurality of the optical waveguide holes, respectively,
a plurality of the conductive bodies are arranged in correspondence with the plurality of the first core members, respectively, and
the optical transmission board comprises a plurality of the optical elements connected to the plurality of conductive bodies, respectively.

15. An optical transmission module, comprising:
the optical transmission board according to claim 1; and
a circuit component electrically connected to the electrically conductive body.

16. An optical transmission module, comprising:
the optical transmission board according to claim 7; and
a circuit component electrically connected to the electrically conductive body.

* * * * *